US011823010B2

United States Patent
Niroula et al.

(10) Patent No.: US 11,823,010 B2
(45) Date of Patent: Nov. 21, 2023

(54) ACCELERATED PATTERN MATCHING METHOD ON A QUANTUM COMPUTING SYSTEM

(71) Applicants: IONQ, INC., College Park, MD (US); University of Maryland, College Park, MD (US)

(72) Inventors: Pradeep Niroula, College Park, MD (US); Yunseong Nam, North Bethesda, MD (US)

(73) Assignees: IONQ, INC., College Park, MD (US); UNIVERSITY OF MARYLAND, College Park, MD (US)

( * ) Notice: Subject to any disclaimer, the term of this patent is extended or adjusted under 35 U.S.C. 154(b) by 394 days.

(21) Appl. No.: 17/313,671

(22) Filed: May 6, 2021

(65) Prior Publication Data
US 2021/0374593 A1  Dec. 2, 2021

Related U.S. Application Data

(60) Provisional application No. 63/031,385, filed on May 28, 2020.

(51) Int. Cl.
*G06N 10/00* (2022.01)
*G06F 9/30* (2018.01)

(52) U.S. Cl.
CPC ......... *G06N 10/00* (2019.01); *G06F 9/30032* (2013.01); *G06F 9/30101* (2013.01)

(58) Field of Classification Search
CPC .. G06N 10/00; G06F 9/30032; G06F 9/30101
(Continued)

(56) References Cited

U.S. PATENT DOCUMENTS 8,633,437 B2   1/2014  Dantus et al.
9,335,606 B2   5/2016  Hanson et al.
(Continued)

FOREIGN PATENT DOCUMENTS

WO  WO-2022019443 A1 *  1/2022  ............ G06F 7/523
WO  WO-2022177895 A1 *  8/2022
(Continued)

OTHER PUBLICATIONS

Kassal, I., Jordan, S. P., Love, P. J., Mohseni, M., Aspuru-Guzik, A. (2008). Polynomial-time quantum algorithm for the simulation of chemical dynamics. Proceedings of the National Academy of Sciences of the United States of America, 105(48), 18681-18686. https://doi.org/10.1073/pnas.0808245105.
(Continued)

*Primary Examiner* — Suresh Memula
(74) *Attorney, Agent, or Firm* — PATTERSON & SHERIDAN, LLP

(57) ABSTRACT

A method of determining a pattern in a sequence of bits using a quantum computing system includes setting a first register of a quantum processor in a superposition of a plurality of string index states, encoding a bit string in a second register of the quantum processor, encoding a bit pattern in a third register of the quantum processor, circularly shifting qubits of the second register conditioned on the first register, amplifying an amplitude of a state combined with the first register in which the circularly shifted qubits of the second register matches qubits of the third register, measuring an amplitude of the first register and determining a string index state of the plurality of string index states associated with the amplified state, and outputting, by use of a classical computer, a string index associated with the first register in the measured state.

20 Claims, 6 Drawing Sheets

(58) Field of Classification Search
USPC .......................................................... 716/100
See application file for complete search history.

(56) References Cited

U.S. PATENT DOCUMENTS

| | | | |
|---|---|---|---|
| 9,858,531 | B1 | 1/2018 | Monroe et al. |
| 11,144,689 | B1* | 10/2021 | Cowtan ................. G06F 30/327 |
| 11,411,658 | B1* | 8/2022 | Vacon .................... H04B 10/70 |
| 2004/0024750 | A1* | 2/2004 | Ulyanov ................ G06N 10/00 |
| 2006/0249670 | A1 | 11/2006 | Monroe et al. |
| 2009/0213444 | A1 | 8/2009 | Goto et al. |
| 2018/0096258 | A1* | 4/2018 | Burchard .............. G06F 1/0307 |
| 2018/0114138 | A1 | 4/2018 | Monroe et al. |
| 2018/0189653 | A1* | 7/2018 | Burchard ................. G06N 7/01 |
| 2019/0171784 | A1* | 6/2019 | Shao ...................... G06F 30/367 |
| 2020/0034347 | A1* | 1/2020 | Selly ....................... G06F 17/16 |
| 2020/0119748 | A1* | 4/2020 | Lucarelli ................ G06N 10/00 |
| 2020/0272926 | A1* | 8/2020 | Chaplin ................. G06N 10/00 |
| 2020/0342344 | A1* | 10/2020 | Gambetta ............. G06N 20/00 |
| 2020/0394544 | A1* | 12/2020 | Low ........................ G16C 10/00 |
| 2021/0150403 | A1* | 5/2021 | Grigoryan ............ H03K 19/195 |
| 2021/0374593 | A1* | 12/2021 | Niroula ............... G06F 9/30032 |
| 2022/0164505 | A1* | 5/2022 | Mosca .................... G06N 10/20 |
| 2022/0398483 | A1* | 12/2022 | Chernoguzov ........ G06N 10/20 |

FOREIGN PATENT DOCUMENTS

| | | | |
|---|---|---|---|
| WO | WO-2023016650 | A1 * | 2/2023 |
| WO | WO-2023084425 | A1 * | 5/2023 |

OTHER PUBLICATIONS

Kim, I. H. (2017). Noise-resilient preparation of quantum many-body ground states. ArXiv:1703.00032 [Quant-Ph].

Kim, I. H., Swingle, B. (2017). Robust entanglement renormalization on a noisy quantum computer. ArXiv:1711.07500 [Quant-Ph].

Kitaev, A. Y., Landau, L. D. (1995). Quantum measurements and the Abelian Stabilizer Problem. ArXiv:Quant-Ph/9511026.

Klco, N., Dumitrescu, E. F., McCaskey, A. J., Morris, T. D., Pooser, R. C., Sanz, M., Solano, E., Lougovski, P., Savage, M. J. (2018). Quantum-Classical Computation of Schwinger Model Dynamics using Quantum Computers. Physical Review A, 98(3), 032331. https://doi.org/10.1103/PhysRevA.98.032331.

Landsman, K. A., Figgatt, C., Schuster, T., Linke, N. M., Yoshida, B., Yao, N. Y., Monroe, C. (2019). Verified Quantum Information Scrambling. Nature, 567(7746), 61-65. https://doi.org/10.1038/s41586-019-0952-6.

Leung, P. H., Brown, K. R. (2018). Entangling an arbitrary pair of qubits in a long ion crystal. Physical Review A, 98(3), 032318. https://doi.org/10.1103/PhysRevA.98.032318.

Leung, P. H., Landsman, K. A., Figgatt, C., Linke, N. M., Monroe, C., Brown, K. R. (2018). Robust 2-Qubit Gates in a Linear Ion Crystal Using a Frequency-Modulated Driving Force. Physical Review Letters, 120(2), 020501. https://doi.org/10.1103/PhysRevLett.120.020501.

Lin, G.-D., Zhu, S.-L., Islam, R., Kim, K., Chang, M.-S., Korenblit, S., Monroe, C., Duan, L.-M. (2009). Large-scale quantum computation in an anharmonic linear ion trap. Europhysics Letters, 86(6), 60004. https://doi.org/10.1209/0295-5075/86/60004.

Linke, N. M., Maslov, D., Roetteler, M., Debnath, S., Figgatt, C., Landsman, K. A., Wright, K., Monroe, C. (2017). Experimental comparison of two quantum computing architectures. Proceedings of the National Academy of Sciences of the United States of America, 114(13), 3305-3310. https://doi.org/10.1073/pnas.1618020114.

Liu, J.-G., Zhang, Y.-H., Wan, Y., Wang, L. (2019). Variational quantum eigensolver with fewer qubits. Physical Review Research, 1(2), 023025. https://doi.org/10.1103/physrevresearch.1.023025.

Lloyd, S., Mohseni, M., Rebentrost, P. (2014). Quantum principal component analysis. Nature Physics, 10(9), 631-633. https://doi.org/10.1038/NPHYS3029.

Lu, Y., Zhang, S., Zhang, K., Chen, W., Shen, Y., Zhang, J., Zhang, J.-N., Kim, K. (2019). Scalable global entangling gates on arbitrary ion qubits. Nature, 572, 363-367. https://doi.org/10.1038/s41586-019-1428-4.

Lu, D., Xu, N., Xu, R., Chen, H., Gong, J., Peng, X., Du, J. (2011). Simulation of chemical isomerization reaction dynamics on a NMR quantum simulator. Physical Review Letters, 107(2), 020501. https://doi.org/10.1103/PhysRevLett.107.020501.

MacDonald, J. K. L. (1934). On the Modified Ritz Variation Method. Physical Review, 46(9), 828. https://doi.org/10.1103/PhysRev.46.828.

Marquet, C., Schmidt-Kaler, F., James, D. F. V. (2003). Phonon-phonon interactions due to non-linear effects in a linear ion trap. Applied Physics B, 76(3), 199-208. https://doi.org/10.1007/s00340-003-1097-7.

Maslov, D. (2017). Basic circuit compilation techniques for an ion-trap quantum machine. New Journal of Physics, 19(2), 023035. https://doi.org/10.1088/1367-2630/aa5e47.

Maslov, D. (2016). Advantages of using relative-phase Toffoli gates with an application to multiple control Toffoli optimization. Physical Review A, 93(2), 022311. https://doi.org/10.1103/PhysRevA.93.022311.

Maslov, D., Nam, Y. (2018). Use of global interactions in efficient quantum circuit constructions. New Journal of Physics, 20(3), 033018. https://doi.org/10.1088/1367-2630/aaa398.

Maslov, D., Nam, Y., Kim, J. (2019). An Outlook for Quantum Computing [Point of View]. Proceedings of the IEEE, 107(1), 5-10. https://doi.org/10.1109/JPROC.2018.2884353.

McArdle, S., Endo, S., Aspuru-Guzik, A., Benjamin, S., Yuan, X. (2020). Quantum computational chemistry. Reviews of Modern Physics, 92(1), 015003. https://doi.org/10.1103/RevModPhys.92.015003.

McArdle, S., Yuan, X., Benjamin, S. (2019). Error-mitigated digital quantum simulation. Physical Review Letters, 122(18), 180501. https://doi.org/10.1103/PhysRevLett.122.180501.

McClean, J. R., Boixo, S., Smelyanskiy, V. N., Babbush, R., Neven, H. (2018). Barren plateaus in quantum neural network training landscapes. Nature Communications, 9, 4812. https://doi.org/10.1038/s41467-018-07090-4.

McClean, J. R., Romero, J., Babbush, R., Aspuru-Guzik, A. (2016). The theory of variational hybrid quantum-classical algorithms. New Journal of Physics, 18(2), 023023. https://doi.org/10.1088/1367-2630/18/2/023023.

McClean, J. R., Schwartz, M. E., Carter, J., de Jong, W. A. (2017). Hybrid Quantum-Classical Hierarchy for Mitigation of Decoherence and Determination of Excited States. Physical Review A, 95(4), 042308. https://doi.org/10.1103/PhysRevA.95.042308.

Merrill, J. T., Brown, K. R. (2014). Progress in compensating pulse sequences for quantum computation. In Sabre Kais (Ed.), Quantum Information and Computation for Chemistry (pp. 241-294). John Wiley Sons. https://doi.org/10.1002/9781118742631.ch10.

Moll, N., Fuhrer, A., Staar, P., Tavernelli, I. (2016). Optimizing qubit resources for quantum chemistry simulations in second quantization on a quantum computer. Journal of Physics A: Mathematical and Theoretical, 49(29), 295301. https://doi.org/10.1088/1751-8113/49/29/295301.

Mølmer, K., Sørensen, A. (1999). Multiparticle Entanglement of Hot Trapped Ions. Physical Review Letters, 82(9), 1835. https://doi.org/10.1103/PhysRevLett.82.1835.

Muller, M. M., Haakh, H. R., Calarco, T., Koch, C. P., Henkel, C. (2011). Prospects for fast Rydberg gates on an atom chip. Quantum Information Processing, 10(6), 771-792. https://doi.org/10.1007/s11128-011-0296-0.

Nam, Y., Chen, J. S., Pisenti, N. C., Wright, K., Delaney, C., Maslov, D., Brown, K. R., Allen, S., Amini, J. M., Apisdorf, J., Beck, K. M., Blinov, A., Chaplin, V., Chmielewski, M., Collins, C., Debnath, S., Hudek, K. M., Ducore, A. M., Keesan, M., Kim, J. (2020). Ground-state energy estimation of the water molecule on a trapped-ion quantum computer. Npj Quantum Information, 6, 33. https://doi.org/10.1038/s41534-020-0259-3.

(56) References Cited

OTHER PUBLICATIONS

Nam, Y., Maslov, D. (2019). Low-cost quantum circuits for classically intractable instances of the Hamiltonian dynamics simulation problem. Npj Quantum Information, 5, 44. https://doi.org/10.1038/s41534-019-0152-0.

Nam, Y., Su, Y., Maslov, D. (2020). Approximate quantum Fourier transform with O(n log(n)) T gates. Npj Quantum Information, 6, 26. https://doi.org/10.1038/s41534-020-0257-5.

Nielsen, M. A., Chuang, I. L. (2010). Quantum computation and quantum information. Cambridge University Press. https://doi.org/10.1017/CBO9780511976667.

OGorman, J., Campbell, E. T. (2017). Quantum computation with realistic magic-state factories. Physical Review A, 95(3), 032338. https://doi.org/10.1103/PhysRevA.95.032338.

OMalley, P. J. J., Babbush, R., Kivlichan, I. D., Romero, J., McClean, J. R., Barends, R., Kelly, J., Roushan, P., Tranter, A., Ding, N., Campbell, B., Chen, Y., Chen, Z., Chiaro, B., Dunsworth, A., Fowler, A. G., Jeffrey, E., Megrant, A., Mutus, J. Y., Martinis, J. M. (2016). Scalable Quantum Simulation of Molecular Energies. Physical Review X, 6(3), 031007. https://doi.org/10.1103/PhysRevX.6.031007.

Orus, R., Mugel, S., Lizaso, E. (2019). Quantum computing for finance: overview and prospects. Reviews in Physics, 4, 100028. https://doi.org/10.1016/j.revip.2019.100028.

Peruzzo, A., McClean, J., Shadbolt, P., Yung, M. H., Zhou, X. Q., Love, P. J., Aspuru-Guzik, A., OBrien, J. L. (2014). A variational eigenvalue solver on a photonic quantum processor. Nature Communications, 5, 4213. https://doi.org/10.1038/ncomms5213.

Preskill, J. (2018). Quantum Computing in the NISQ era and beyond. Quantum, 2, 79. https://doi.org/10.22331/q-2018-08-06-79.

Reiher, M., Wiebe, N., Svore, K. M., Wecker, D., Troyer, M. (2017). Elucidating reaction mechanisms on quantum computers. Proceedings of the National Academy of Sciences of the United States of America, 114(29), 7555-7560. https://doi.org/10.1073/pnas.1619152114.

Richardson, L., Gaunt, J. A. (1927). The deferred approach to the limit. Phil. Trans. R. Soc. Lond. A, 226(636-646), 299-361. https://doi.org/10.1098/rsta.1927.0008.

Santagati, R., Wang, J., Gentile, A. A., Paesani, S., Wiebe, N., Mcclean, J. R., Morley-Short, S., Shadbolt, P. J., Bonneau, D., Silverstone, J. W., Tew, D. P., Zhou, X., Obrien, J. L., Thompson, M. G. (2018). Witnessing eigenstates for quantum simulation of Hamiltonian spectra. Science Advances, 4(1), eaap9646. https://doi.org/10.1126/sciadv.aap9646.

Seeley, J. T., Richard, M. J., Love, P. J. (2012). The Bravyi-Kitaev transformation for quantum computation of electronic structure. Journal of Chemical Physics, 137(22), 224109. https://doi.org/10.1063/1.4768229.

Shantanu, D. (2016). A Programmable Five Qubit Quantum Computer Using Trapped Atomic Ions. University of Maryland Department of Physics and National Institute of Standards and Technology.

Shen, Y., Zhang, X., Zhang, S., Zhang, J. N., Yung, M. H., Kim, K. (2017). Quantum implementation of the unitary coupled cluster for simulating molecular electronic structure. Physical Review A, 95(2). https://doi.org/10.1103/PhysRevA.95.020501.

Shehab, O., Landsman, K. A., Nam, Y., Zhu, D., Linke, N. M., Keesan, M. J., Pooser, R. C., Monroe, C. R. (2019). Toward convergence of effective field theory simulations on digital quantum computers. Physical Review A, 100(6), 062319. https://doi.org/10.1103/PhysRevA.100.062319.

Shor, P. W. (1999). Polynomial-Time Algorithms for Prime Factorization and Discrete Logarithms on a. SIAM Review, 41(2), 303-332.

Shende, V. V., Markov, I. L., Bullock, S. S. (2004). Minimal universal two-qubit controlled-NOT-based circuits. Physical Review A, 69(6), 062321. https://doi.org/10.1103/PhysRevA.69.062321.

Sørensen, A., Mølmer, K. (1999). Quantum Computation with Ions in Thermal Motion. Physical Review Letters, 82(9), 1971. https://doi.org/10.1103/PhysRevLett.82.1971.

Sporl, A., Schulte-Herbruggen, T., Glaser, S. J., Bergholm, V., Storcz, M. J., Ferber, J., Wilhelm, F. K. (2007). Optimal control of coupled Josephson qubits. Physical Review A, 75(1), 012302. https://doi.org/10.1103/PhysRevA.75.012302.

Takeshita, T., Rubin, N. C., Jiang, Z., Lee, E., Babbush, R., McClean, J. R. (2020). Increasing the representation accuracy of quantum simulations of chemistry without extra quantum resources. Physical Review X, 10(1), 011004. https://doi.org/10.1103/PhysRevX.10.011004.

Abraham J Wyner. (1994). String matching theorems and applications to data compression and statistics. Stanford University.

Brassard, G., Høyer, P., Mosca, M., & Tapp, A. (2002). Quantum amplitude amplification and estimation. In S. J. Lomonaco & H. E. Brandt (Eds.), Quantum Computation and Information (pp. 53-74). American Mathematical Society. https://doi.org/10.1090/conm/305.

Grover, L. K. (1996). A fast quantum mechanical algorithm for database search. Proceedings of the Twenty-Eighth Annual ACM Symposium on Theory of Computing—STOC '96. https://doi.org/10.1145/237814.237866.

Hakak, S. I., Kamsin, A., Shivakumara, P., Gilkar, G. A., Khan, W. Z., & Imran, M. (2019). Exact String Matching Algorithms: Survey, Issues, and Future Research Directions. IEEE Access, 7. https://doi.org/10.1109/ACCESS.2019.2914071.

Knuth, D. E., Morris, J. H., Jr. & Pratt, V. R. (1977). Fast Pattern Matching in Strings. SIAM Journal on Computing, 6 (2). https://doi.org/10.1137/0206024.

Kuperberg, G. (2005). A Subexponential-Time Quantum Algorithm for the Dihedral Hidden Subgroup Problem. SIAM Journal on Computing, 35(1). https://doi.org/10.1137/S0097539703436345.

Landau, G. M., & Vishkin, U. (1994). Pattern matching in a digitized image. Algorithmica, 12(4-5). <https://doi.org/10.1007/BF01185433>.

Montanaro, A. (2017). Quantum Pattern Matching Fast on Average. Algorithmica, 77(1). https://doi.org/10.1007/s00453-015-0060-4.

Nam, Y., Ross, N. J., Su, Y., Childs, A. M., & Maslov, D. (2018). Automated optimization of large quantum circuits with continuous parameters. Npj Quantum Information, 4(1). https://doi.org/10.1038/s41534-018-0072-4.

Owen, B. J., & Sathyaprakash, B. S. (1999). Matched filtering of gravitational waves from inspiraling compact binaries: Computational cost and template placement. Physical Review D, 60(2). https://doi.org/10.1103/PhysRevD.60.022002.

Ramesh, H., & Vinay, V. (2003). String matching in O(n+m) quantum time. Journal of Discrete Algorithms, 1(1). https://doi.org/10.1016/S1570-8667(03)00010-8.

Rasmussen, S. E., Groenland, K., Gerritsma, R., Schoutens, K., & Zinner, N. T. (2020). Single-step implementation of high-fidelity n-bit Toffoli gates. Physical Review A, 101(2). https://doi.org/10.1103/PhysRevA.101.022308.

Sasaki, M., Carlini, A., & Jozsa, R. (2001). Quantum template matching. Physical Review A, 64(2). https://doi.org/10.1103/PhysRevA.64.022317.

Charras, C., & Lecroq, T. (2004). Handbook of Exact string matching algorithms. Citeseer. (Book—220 pages).

International Search Report dated May 29, 2020 for Application No. PCT/US2020/015232.

International Search Report dated May 28, 2020 for Application No. PCT/US2020/015234.

International Search Report dated May 28, 2020 for Application No. PCT/US2020/015235.

Aspuru-Guzik. Alan, Dutoi. Anthony D., Love, P. J., Head-Gordon, M. (2005). Simulated Quantum Computation of Molecular Energies. Science, 309(5741), 1704-1707. https://doi.org/10.1126/science.1113479.

Aloul, F. A., Ramani, A., Markov, I. L., Sakallah, K. A. (2002). Solving Difficult SAT Instances in the Presence of Symmetry. Proceedings of the 39th Annual Design Automation Conference, 731-736. https://doi.org/10.1145/513918.514102.

Babbush, R., Gidney, C., Berry, D. W., Wiebe, N., McClean, J., Paler, A., Fowler, A., Neven, H. (2018). Encoding Electronic Spectra in Quantum Circuits with Linear T Complexity. Physical Review X, 8(4), 041015. https://doi.org/10.1103/PhysRevX.8.041015.

(56) References Cited

OTHER PUBLICATIONS

Ballance, C. J., Harty, T. P., Linke, N. M., Sepiol, M. A., Lucas, D. M. (2016). High-Fidelity Quantum Logic Gates Using Trapped-Ion Hyperfine Qubits. Physical Review Letters, 117(6), 060504. https://doi.org/10.1103/PhysRevLett.117.060504.
Barkoutsos, P. K., Gonthier, J. F., Sokolov, I., Moll, N., Salis, G., Fuhrer, A., Ganzhorn, M., Egger, D. J., Troyer, M., Mezzacapo, A., Filipp, S., Tavernelli, I. (2018). Quantum algorithms for electronic structure calculations: particle-hole Hamiltonian and optimized wavefunction expansions. Physical Review A, 98(2), 022322. https://doi.org/10.1103/PhysRevA.98.022322.
Beauregard, S. (2003). Circuit for Shor's algorithm using 2n+3 qubits. Quantum Information and Computation, 3(2), 175-185. https://doi.org/https://dl.acm.org/doi/10.5555/2011517.2011525.
Benedetti, M., Garcia-Pintos, D., Perdomo, O., Leyton-Ortega, V., Nam, Y., Perdomo-Ortiz, A. (2019). A generative modeling approach for benchmarking and training shallow quantum circuits. Npj Quantum Information, 5, 45. https://doi.org/10.1038/s41534-019-0157-8.
Bera, D., Fenner, S., Green, F., Homer, S. (2008). Universal Quantum Circuits. ArXiv:0804.2429 [Cs.CC].
Bernstein, E., Vazirani, U., Comput, S. J. (1997). Quantum Complexity Theory. SIAM Journal on Computing, 26(5), 1411-1473. https://doi.org/10.1137/S0097539796300921.
Blumel, R., Grzesiak, N., Nam, Y. (2019). Power-optimal, stabilized entangling gate between trapped-ion qubits. ArXiV:1905.09292 [Quant-Ph].
Boyd, S. P., Vandenberghe, L. (2004). Convex optimization. Cambridge University Press.
Bravyi, S., Gambetta, J. M., Mezzacapo, A., Temme, K. (2017). Tapering off qubits to simulate fermionic Hamiltonians. ArXiv:1701.08213 [Quant-Ph].
Bravyi, S., Haah, J. (2012). Magic-state distillation with low overhead. Physical Review A, 86(5), 052329. https://doi.org/10.1103/PhysRevA.86.052329.
Bravyi, S. B., Landau, L. D., Kitaev, A. Y. (2002). Fermionic quantum computation. Annals of Physics, 298(1), 210-226. https://doi.org/10.1006/aphy.2002.6254Calderon-Vargas, F. A., Barron, G. S., Deng, X.-H., Sigillito, A. J., Barnes, E., Economou, S. E. (2019). Fast high-fidelity entangling gates for spin qubits in Si double quantum dots. Physical Review B, 100(3), 035304. https://doi.org/10.1103/PhysRevB.100.035304.
Childs, A. M., Maslov, D., Nam, Y., Ross, N. J., Su, Y. (2018). Toward the first quantum simulation with quantum speedup. Proceedings of the National Academy of Sciences of the United States of America, 115(38), 9456-9461. https://doi.org/10.1073/pnas.1801723115.
Choi, T., Debnath, S., Manning, T. A., Figgatt, C., Gong, Z. X., Duan, L. M., Monroe, C. (2014). Optimal quantum control of multimode couplings between trapped ion qubits for scalable entanglement. Physical Review Letters, 112(19), 190502. https://doi.org/10.1103/PhysRevLett.112.190502.
Chow, J. M. (2010). Quantum Information Processing with Superconducting Qubits. Yale University.
Colless, J. I., Ramasesh, V. V., Dahlen, D., Blok, M. S., Kimchi-Schwartz, M. E., McClean, J. R., Carter, J., De Jong, W. A., Siddiqi, I. (2018). Computation of Molecular Spectra on a Quantum Processor with an Error-Resilient Algorithm. Physical Review X, 8(1), 011021. https://doi.org/10.1103/PhysRevX.8.011021.
Cormen, T. H., Leiserson, C. E., Rivest, R. L., Clifford Stein. (2009). Introduction to algorithms. MIT press.
Crooks, G. E. (2018). Performance of the Quantum Approximate Optimization Algorithm on the Maximum Cut Problem. ArXiv:1811.08419 [Quant-Ph].
Debnath, S., Linke, N. M., Figgatt, C., Landsman, K. A., Wright, K., Monroe, C. (2016). Demonstration of a small programmable quantum computer with atomic qubits. Nature, 536(7614), 63-66. https://doi.org/10.1038/nature18648.
Dobšíček, M., Johansson, G., Shumeiko, V., Wendin, G. (2007). Arbitrary accuracy iterative phase estimation algorithm as a two qubit benchmark. Physical Review A, 76(3), 030306. https://doi.org/10.1103/PhysRevA.76.030306.
Draper, T. G., Kutin, S. A., Rains, E. M., Svore, K. M. (2006). A Logarithmic-Depth Quantum Carry-Lookahead Adder. Quantum Information Computation, 6(4), 351-369. https://doi.org/10.5555/2012086.2012090.
Dumitrescu, E. F., McCaskey, A. J., Hagen, G., Jansen, G. R., Morris, T. D., Papenbrock, T., Pooser, R. C., Dean, D. J., Lougovski, P. (2018). Cloud Quantum Computing of an Atomic Nucleus. Physical Review Letters, 120(21), 210501. https://doi.org/10.1103/PhysRevLett.120.210501.
Endo, S., Benjamin, S. C., Li, Y. (2018). Practical Quantum Error Mitigation for Near-Future Applications. Physical Review X, 8(3), 031027. https://doi.org/10.1103/PhysRevX.8.031027.
Endo, S., Jones, T., McArdle, S., Yuan, X., Benjamin, S. (2019). Variational quantum algorithms for discovering Hamiltonian spectra. Physical Review A, 99(6), 062304. https://doi.org/10.1103/PhysRevA.99.062304.
Jordan, V. P., Wigner in GSttingen, E. (1928). Uber das Paulische Aquivalenzverbot. Zeitschrift Fur Physik, 47, 631-651. https://doi.org/0.1007/BF01331938.
Evenbly, G., Vidal, G. (2007). Algorithms for entanglement renormalization. Physical Review B, 79(14), 144108. https://doi.org/10.1103/PhysRevB.79.144108.
Farhi, E., Goldstone, J., Gutmann, S. (2014). A Quantum Approximate Optimization Algorithm. ArXiv:1411.4028 [Quant-Ph].
Feynman, R. P. (1982). Simulating Physics with Computers. In International Journal of Theoretical Physics (vol. 21, Issue 6). https://doi.org/10.1007/BF02650179.
Figgatt, C., Ostrander, A., Linke, N. M., Landsman, K. A., Zhu, D., Maslov, D., Monroe, C. (2019). Parallel Entangling Operations on a Universal Ion Trap Quantum Computer. Nature, 572, 368-372. https://doi.org/10.1038/s41586-019-1427-5.
Figgatt, C. M. (2018). Building and Programming a Universal Ion Trap Quantum Computer. University of Maryland.
Gaebler, J. P., Tan, T. R., Lin, Y., Wan, Y., Bowler, R., Keith, A. C., Glancy, S., Coakley, K., Knill, E., Leibfried, D., Wineland, D. J. (2016). High-Fidelity Universal Gate Set for Be 9 + Ion Qubits. Physical Review Letters, 117(6), 060505. https://doi.org/10.1103/PhysRevLett.117.060505.
Gambetta, J. M., Motzoi, F., Merkel, S. T., Wilhelm, F. K. (2011). Analytic control methods for high-fidelity unitary operations in a weakly nonlinear oscillator. Physical Review A, 83(1), 012308. https://doi.org/10.1103/PhysRevA.83.012308.
Gene M. Amdahl. (1967). Validity of the single processor approach to achieving large scale computing capabilities. AFIPS Spring Joint Computer Conference.
Goemans, E. X., Williamson, D. P., Williamson, D. P., Goemans, M. X. (1994). Improved Approximation Algorithms for Maximum Cut and Satisfiability Problems Using Semidefinite Programming. Journal of the Association for Computing Machinery, 42(6), 1115-1145. https://doi.org/10.1145/227683.227684.
Green, T. J., Biercuk, M. J. (2015). Phase-modulated decoupling and error suppression in qubit-oscillator systems. Physical Review Letters, 114(12), 120502. https://doi.org/10.1103/PhysRevLett.114.120502.
Grover, L. K. (1997). Quantum Mechanics Helps in Searching for a Needle in a Haystack. Physical Review Letters, 79(2), 325. https://doi.org/https://doi.org/10.1103/PhysRevLett.79.325.
Grzesiak, N., Blumel, R., Wright, K., Beck, K. M., Pisenti, N. C., Li, M., Chaplin, V., Amini, J. M., Debnath, S., Chen, J. S., Nam, Y. (2020). Efficient arbitrary simultaneously entangling gates on a trapped-ion quantum computer. Nature Communications, 11, 2963. https://doi.org/10.1038/s41467-020-16790-9.
Hadfield, S., Papageorgiou, A. (2018). Divide and conquer approach to quantum Hamiltonian simulation. New Journal of Physics, 20(4), 043003. https://doi.org/10.1088/1367-2630/aab1ef.
Harrow, A. W., Hassidim, A., Lloyd, S. (2009). Quantum algorithm for linear systems of equations. Physical Review Letters, 103(15), 150502. https://doi.org/10.1103/PhysRevLett.103.150502.
Harty, T. P., Allcock, D. T. C., Ballance, C. J., Guidoni, L., Janacek, H. A., Linke, N. M., Stacey, D. N., Lucas, D. M. (2014). High-fidelity preparation, gates, memory, and readout of a trapped-ion

(56) References Cited

OTHER PUBLICATIONS quantum bit. Physical Review Letters, 113(22), 220501. https://doi.org/10.1103/PhysRevLett.113.220501.

Hempel, C., Maier, C., Romero, J., McClean, J., Monz, T., Shen, H., Jurcevic, P., Lanyon, B., Love, P., Babbush, R., Aspuru-Guzik, A., Blatt, R., Roos, C. (2018). Quantum chemistry calculations on a trapped-ion quantum simulator. Physical Review X, 8(3), 031022. https://doi.org/10.1103/PhysRevX.8.031022.

Hewitt, E., Hewitt, R. E. (1979). The Gibbs-Wilbraham Phenomenon: An Episode in Fourier Analysis. Archive for History of Exact Sciences, 21, 129-160. https://doi.org/10.1007/BF00330404.

Higgott, O., Wang, D., Brierley, S. (2019). Variational Quantum Computation of Excited States. Quantum, 156. https://doi.org/10.22331/q-2019-07-01-156.

Jones, N. C., Whitfield, J. D., McMahon, P. L., Yung, M. H., Meter, R. Van, Aspuru-Guzik, A., Yamamoto, Y. (2012). Faster quantum chemistry simulation on fault-tolerant quantum computers. New Journal of Physics, 14, 115023. https://doi.org/10.1088/1367-2630/14/11/115023.

Kandala, A., Mezzacapo, A., Temme, K., Takita, M., Brink, M., Chow, J. M., Gambetta, J. M. (2017). Hardware-efficient Variational Quantum Eigensolver for Small Molecules and Quantum Magnets. Nature, 549, 242-246. https://doi.org/10.1038/nature23879.

Toloui, B., Love, P. J. (2013). Quantum Algorithms for Quantum Chemistry based on the sparsity of the CI-matrix. ArXiv:1312.2579 [Quant-Ph].

Tranter, A., Sofia, S., Seeley, J., Kaicher, M., McClean, J., Babbush, R., Coveney, P. V., Mintert, F., Wilhelm, F., Love, P. J. (2015). The Bravyi-Kitaev transformation: Properties and applications. International Journal of Quantum Chemistry, 115(19), 1431-1441. https://doi.org/10.1002/qua.24969.

Van Dam, W., Hallgren, S., Ip, L. (2006). Quantum algorithms for some hidden shift problems. SIAM Journal on Computing, 36(3), 763-778. https://doi.org/10.1137/S009753970343141X.

Wang, Y., Um, M., Zhang, J., An, S., Lyu, M., Zhang, J. N., Duan, L. M., Yum, D., Kim, K. (2017). Single-qubit quantum memory exceeding ten-minute coherence time. Nature Photonics, 11(10), 646-650. https://doi.org/10.1038/s41566-017-0007-1.

Ward, N. J., Kassal, I., Aspuru-Guzik, A. (2009). Preparation of many-body states for quantum simulation. Journal of Chemical Physics, 130(19), 194105. https://doi.org/10.1063/1.3115177.

Webb, A. E., Webster, S. C., Collingbourne, S., Bretaud, D., Lawrence, A. M., Weidt, S., Mintert, F., Hensinger, W. K. (2018). Resilient entanglement gates for trapped ions. Physical Review Letters, 121(18), 180501. https://doi.org/10.1103/PhysRevLett.121.180501.

Wecker, D., Bauer, B., Clark, B. K., Hastings, M. B., Troyer, M. (2014). Gate count estimates for performing quantum chemistry on small quantum computers. Physical Review A, 90(2), 022305. https://doi.org/10.1103/PhysRevA.90.022305.

Weinstein, D. H. (1934). Modified Ritz Method. Proceedings of the National Academy of Sciences, 20, 529-532.

Welch, J., Greenbaum, D., Mostame, S., Aspuru-Guzik, A. (2014). Efficient quantum circuits for diagonal unitaries without ancillas. New Journal of Physics, 16, 033040. https://doi.org/10.1088/1367-2630/16/3/033040.

Whitfield, J. D., Biamonte, J., Aspuru Guzik, A. (2011). Simulation of electronic structure Hamiltonians using quantum computers. Molecular Physics, 109(5), 735-750. https://doi.org/10.1080/00268976.2011.552441.

Wineland, D. J., Monroe, C., Itano, W. M., Leibfried, D., King, B. E., Meekhof, D. M. (1998). Experimental Issues in Coherent Quantum-State Manipulation of Trapped Atomic Ions. Journal of Research of the National Institute of Standards and Technology, 103(3), 259. https://doi.org/10.6028/jres.103.019.

Wright, K., Beck, K. M., Debnath, S., Amini, J. M., Nam, Y., Grzesiak, N., Chen, J. S., Pisenti, N. C., Chmielewski, M., Collins, C., Hudek, K. M., Mizrahi, J., Wong-Campos, J. D., Allen, S., Apisdorf, J., Solomon, P., Williams, M., Ducore, A. M., Blinov, A., Kim, J. (2019). Benchmarking an 11-qubit quantum computer. Nature Communications, 10, 5464. https://doi.org/10.1038/s41467-019-13534-2.

Wu, Y., Wang, S. T., Duan, L.-M. (2018). Noise analysis for high-fidelity quantum entangling gates in an anharmonic linear Paul trap. Physical Review A, 97(6), 062325. https://doi.org/10.1103/PhysRevA.97.062325.

Zhu, S. L., Monroe, C., Duan, L. M. (2006). Arbitrary-speed quantum gates within large ion crystals through minimum control of laser beams. Europhysics Letters, 73, 485-491. https://doi.org/10.1209/epl/i2005-10424-4.

Zhu, S.-L., Monroe, C., Duan, L.-M. (2006). Trapped ion quantum computation with transverse phonon modes. Physical Review Letters, 97(5), 050505. https://doi.org/10.1103/PhysRevLett.97.050505.

\* cited by examiner

ACCELERATED PATTERN MATCHING METHOD ON A QUANTUM COMPUTING SYSTEM

CROSS-REFERENCE TO RELATED APPLICATIONS

This application claims the benefit to U.S. Provisional Application No. 63/031,385, filed May 28, 2020, which is incorporated by reference herein.

GOVERNMENT LICENSE RIGHTS

This invention was made with Government support under DESC0019040 and DE-SC0020312 awarded by the Department of Energy. The Government has certain rights in the invention.

BACKGROUND

Field

The present disclosure generally relates to a method of performing computation in a quantum computing system, and more specifically, to a method of searching for a bit pattern in a bit string using a computing system that are a group of trapped ions.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process.

Among physical systems upon which it is proposed to build large-scale quantum computers, is a group of ions (e.g., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a group of trapped ions, which arise from their Coulombic interaction between the ions. In general, entanglement occurs when pairs or groups of ions (or particles) are generated, interact, or share spatial proximity in ways such that the quantum state of each ion cannot be described independently of the quantum state of the others, even when the ions are separated by a large distance.

Pattern matching is ubiquitously used in various areas, such as image processing, study of DNA sequences, and data compression and statistics. Computational complexity of a pattern matching process (i.e., the amount of resources required to run the pattern matching process, in particular, time and memory requirements) varies as the size of input varies. For example, in a string matching process that is the simplest pattern matching process, in which a bit pattern $\mathcal{P}$ of length M is searched within a bit string $\mathcal{T}$ of length N (M≤N), the amount of time resources scales as $\Theta(N+M)$ in units of elementary logic operations (which takes a constant amount of time on a given computer) and the amount of memory resources scales as $\mathcal{O}(N+M)$ in units of bits, by the best known classical methods.

Therefore, there is a need for method for using a quantum processor to speed up pattern matching in a quantum computing system.

SUMMARY

Embodiments described herein provide a method of determining a pattern in a sequence of bits using a quantum computing system. The method includes setting a first register of a quantum processor in a superposition of a plurality of string index states, encoding a bit string in a second register of the quantum processor, encoding a bit pattern in a third register of the quantum processor, circularly shifting qubits of the second register conditioned on the first register, amplifying an amplitude of a state combined with the first register in which the circularly shifted qubits of the second register matches qubits of the third register, measuring an amplitude of the first register and determining a string index state of the plurality of string index states associated with the amplified state, and outputting, by use of a classical computer, a string index associated with the first register in the measured state.

Embodiments described herein also provides a quantum computing system for determining a pattern in a sequence of bits. The quantum computing system includes a quantum processor including a group of trapped ions, each of the trapped ions having two frequency-separated states, one or more lasers configured to emit a laser beam, which is provided to trapped ions in the quantum processor, a classical computer, and a system controller. The classical computer is configured to select a bit string and a bit pattern to be searched within the bit string, each bit of the bit string having a string index. The system controller is configured to set a first register of the quantum processor in a superposition of a plurality of string index states, each of which is associated with a string index, encode the bit string in a second register of the quantum processor, encode the bit pattern in a third register of the quantum processor, circularly shift qubits of the second register conditioned on the first register in each string index state in the superposition of the plurality of string index states, amplify an amplitude of a state combined with the first register in a string index state of the plurality of string index states in which the circularly shifted qubits of the second register matches qubits of the third register, and measure an amplitude of the first register and determining the string index state of the plurality of string index states associated with the amplified state. The classical computer is further configured to output the string index associated with the first register in the measured state.

Embodiments described herein further provide a quantum computing system including non-volatile memory having a number of instructions stored therein. The instruction, when executed by one or more processors, cause the quantum computing system to perform operations including setting a first register of the quantum processor in a superposition of a plurality of string index states, each of which is associated with a string index, where the quantum processor includes a plurality of qubits, encoding a bit string in a second register of the quantum processor, encoding a bit pattern in a third register of the quantum processor, circularly shifting qubits of the second register conditioned on the first register in each string index state in the superposition of the plurality of string index states, amplifying an amplitude of a state combined with the first register in a string index state of the plurality of string index states in which the circularly shifted qubits of the second register matches qubits of the third register, measuring an amplitude of the first register and determining the string index state of the plurality of string index states associated with the amplified state, and outputting, by use of a classical computer, the string index associated with the first register in the measured state. The quantum computing system further includes selecting, by use of the classical computer, the bit string and the bit pattern to be searched within the bit string, each bit of the bit string having a string index, where each qubit of the plurality of qubits includes a trapped ion having two frequency-separated states. The quantum computing system further includes preparing the quantum processor in an initial state by setting, by a system controller, each trapped ion in the quantum processor in the lower energy state of the two frequency-separated states. Setting the first register of the quantum processor in the superposition of the plurality of string index states includes transferring, by the system controller, each trapped ion in the first register in a superposition of the two frequency-separated states. Encoding the bit string in the second register of the quantum processor includes applying, by the system controller, a combination of single-qubit gate operations to the second register of the quantum processor. Encoding the bit pattern in the third register of the quantum processor includes applying, by the system controller, a combination of single-qubit gate operations to the third register of the quantum processor. Circularly shifting qubits of the second register conditioned on the first register includes applying, by the system controller, a combination of single-qubit gate operations and two-qubit gate operations to the first and second registers of the quantum processor. The two-qubit gate operations includes controlled-SWAP operations applied to the second register conditioned on the first register. The two-qubit gate operations includes controlled-SWAP operations applied to the second register conditioned on a plurality of ancillary qubits in which the first register is copied by fan-out CNOT operations applied on the plurality of ancillary qubits conditioned on the first register. Amplifying the state combined with the first register in the string index state of the plurality of string index states in which the circularly shifted qubits of the second register matches qubits of the third register includes applying, by the system controller, a combination of single-qubit gate operations and two-qubit gate operations to the second and third registers of the quantum processor.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
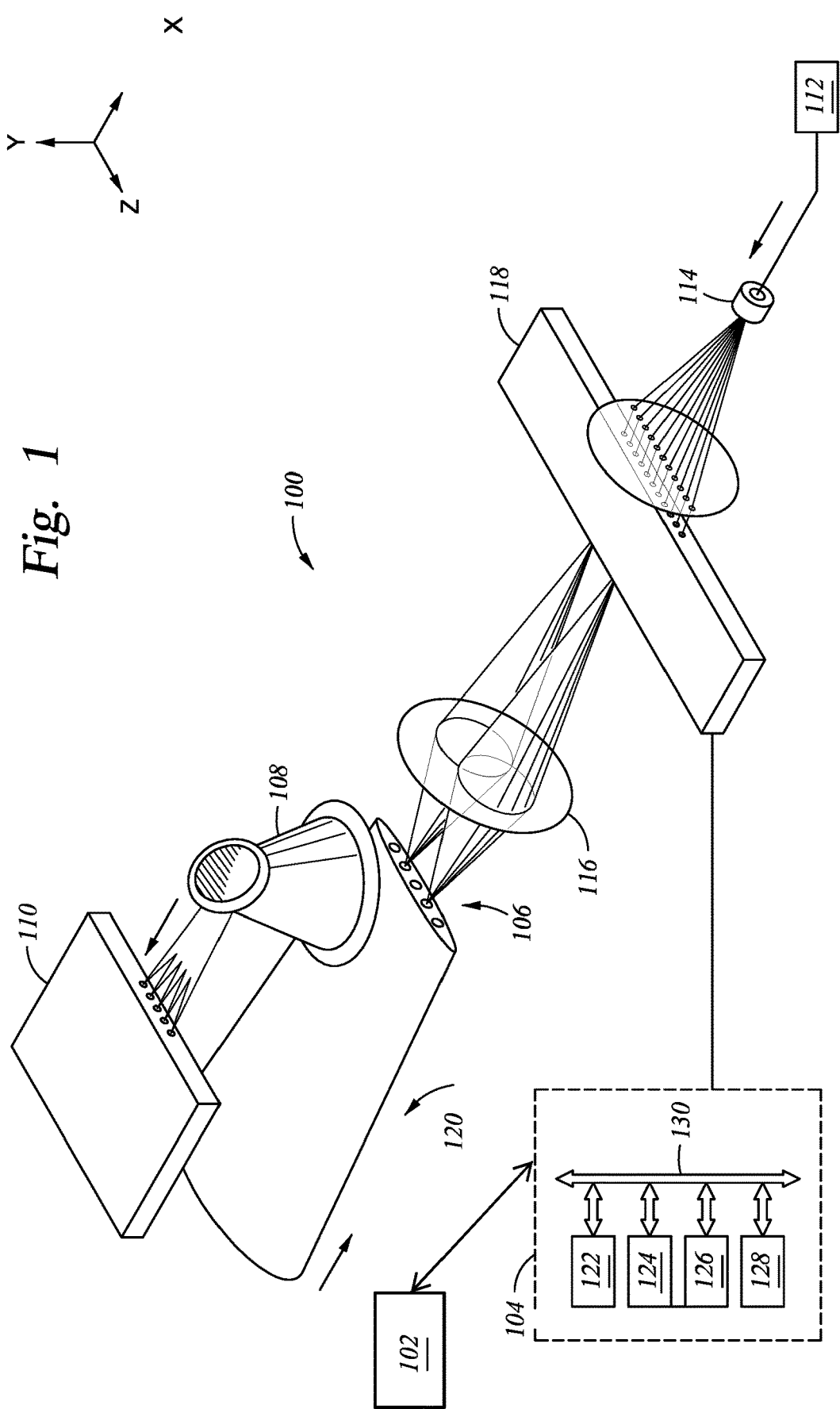
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method of performing computation in a quantum computing system, and more specifically, to a method of searching for a bit pattern in a bit string using a computing system that are a group of trapped ions.

A quantum computing system that is able to solve a pattern matching problem may include a classical computer, a system controller, and a quantum processor. The classical computer performs supporting and system control tasks including selecting a bit string and a bit pattern to be searched within the bit string by use of a user interface. The classical computer further converts a series of logic gates into laser pulses to be applied on the quantum processor by the system processor. A software program for performing the tasks is stored in a non-volatile memory within the classical computer. The quantum processor includes trapped ions that are coupled by use of various hardware, including lasers to manipulate internal hyperfine states (qubit states) of the trapped ions and photomultiplier tubes (PMTs) to read-out the internal hyperfine states (qubit states) of the trapped ions. The system controller receives from the classical computer instructions for controlling the quantum processor, and controls various hardware associated with controlling any and all aspects of the process of controlling the quantum processor, and returns a read-out of the quantum processor and thus output of results of the computation(s) to the classical computer.

The methods and systems described herein include an efficient pattern matching routine that provides improvements over conventional pattern matching routines.

General Hardware Configurations

FIG. 1 is a schematic partial view of an ion trap quantum computing system, or system 100, according to one embodiment. The system 100 includes a classical (digital) computer 102, a system controller 104 and a quantum processor that is a group 106 of trapped ions (i.e., five shown) that extend along the Z-axis. Each ion in the group 106 of trapped ions is an ion having a nuclear spin I and an electron spin S such that a difference between the nuclear spin I and the electron spin S is zero, such as a positive ytterbium ion, $^{171}$Yb$^+$, a positive barium ion $^{133}$Ba$^+$, a positive cadmium ion $^{111}$Cd$^+$ or $^{113}$Cd$^+$, which all have a nuclear spin I=½ and the $^2S_{1/2}$ hyperfine states. In some embodiments, all ions in the group 106 of trapped ions are the same species and isotope (e.g., $^{171}$Yb$^+$). In some other embodiments, the group 106 of trapped ions includes one or more species or isotopes (e.g., some ions are $^{171}$Yb$^+$ and some other ions are $^{133}$Ba$^+$). In yet additional embodiments, the group 106 of trapped ions may include various isotopes of the same species (e.g., different isotopes of Yb, different isotopes of Ba). The ions in the group 106 of trapped ions are individually addressed with separate laser beams. The classical computer 102 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 for measurement of individual ions. Non-copropagating Raman laser beams from a laser 112, which are provided along the X-axis, perform operations on the ions. A diffractive beam splitter 114 creates an array of static Raman beams 116 that are individually switched using a multi-channel acousto-optic modulator (AOM) 118 and is configured to selectively act on individual ions. A global Raman laser beam 120 illuminates all ions at once. In some embodiments, individual Raman laser beams (not shown) each illuminate individual ions. The system controller (also referred to as a "RF controller") 104 controls the AOM 118 and thus controls laser pulses to be applied to trapped ions in the group 106 of trapped ions. The system controller 104 includes a central processing unit (CPU) 122, a read-only memory (ROM) 124, a random access memory (RAM) 126, a storage unit 128, and the like. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by processor in order to perform various functionalities associated with receiving and analyzing data and controlling any and all aspects of the methods and hardware used to create the ion trap quantum computer system 100 discussed herein.

Figure 2:
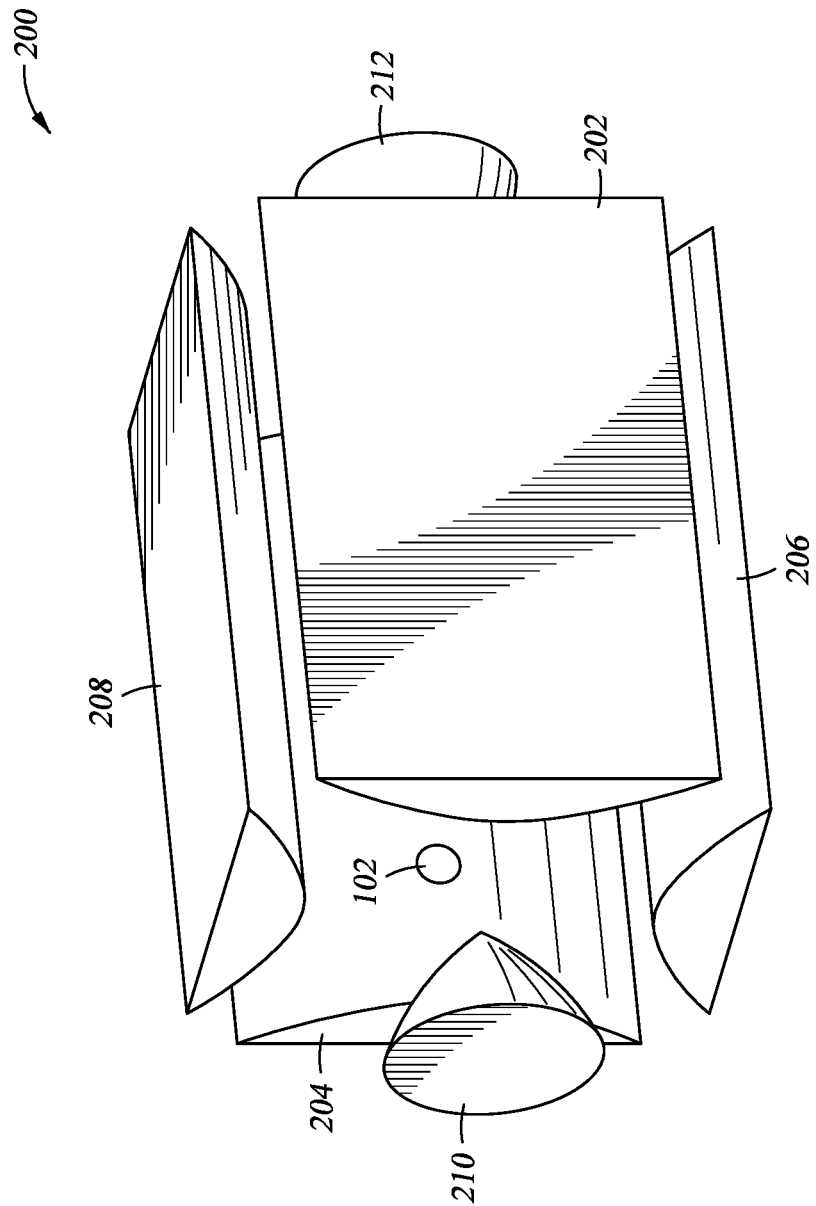
FIG. 2 depicts a schematic view of an ion trap for confining ions in a group according to one embodiment.

FIG. 2 depicts a schematic view of an ion trap 200 (also referred to as a Paul trap) for confining ions in the group 106 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the group 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Figure 3:
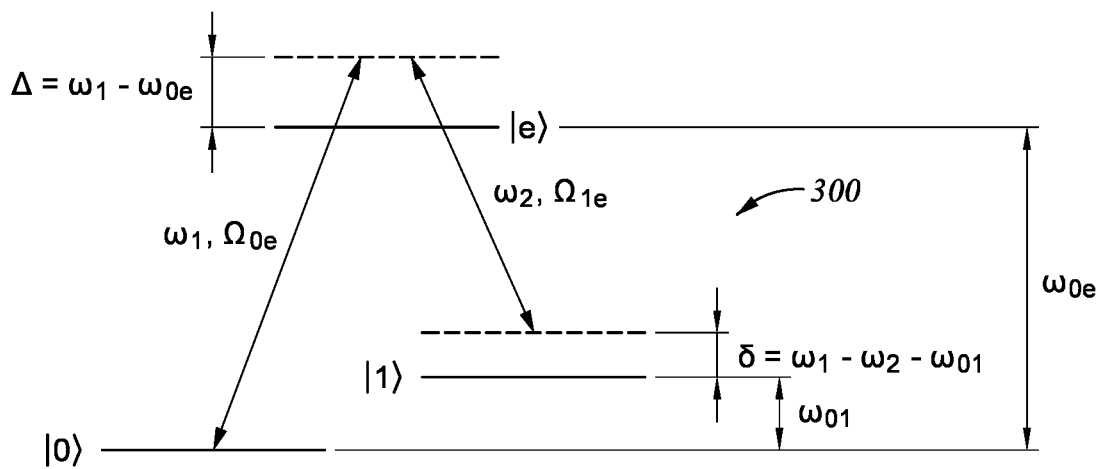
FIG. 3 depicts a schematic energy diagram of each ion in a group of trapped ions according to one embodiment.

FIG. 3 depicts a schematic energy diagram 300 of each ion in the group 106 of trapped ions according to one embodiment. Each ion in the group 106 of trapped ions is an ion having a nuclear spin I and an electron spin S such that a difference between the nuclear spin I and the electron spin S is zero. In one example, each ion may be a positive Ytterbium ion, $^{171}$Yb$^+$, which has a nuclear spin I=½ and the $^2S_{1/2}$ hyperfine states (i.e., two electronic states) with an energy split corresponding to a frequency difference (referred to as a "carrier frequency") of $\omega_{01}/2\pi$=12.642821 GHz. In other examples, each ion may be a positive barium ion $^{133}$Ba$^+$, a positive cadmium ion $^{111}$Cd$^+$ or $^{113}$Cd$^+$, which all have a nuclear spin I=½ and the $^2S_{1/2}$ hyperfine states. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_m$ for any motional mode m with no phonon excitation (i.e., $n_{ph}$=0) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_m$ with the subscript m denotes the motional ground state for a motional mode m of a group 106 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-propagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions (Be$^+$, Ca$^+$, Sr$^+$, Mg+, and Ba$^+$) or transition metal ions (Zn$^+$, Hg$^+$, Cd$^+$).

Figure 4:
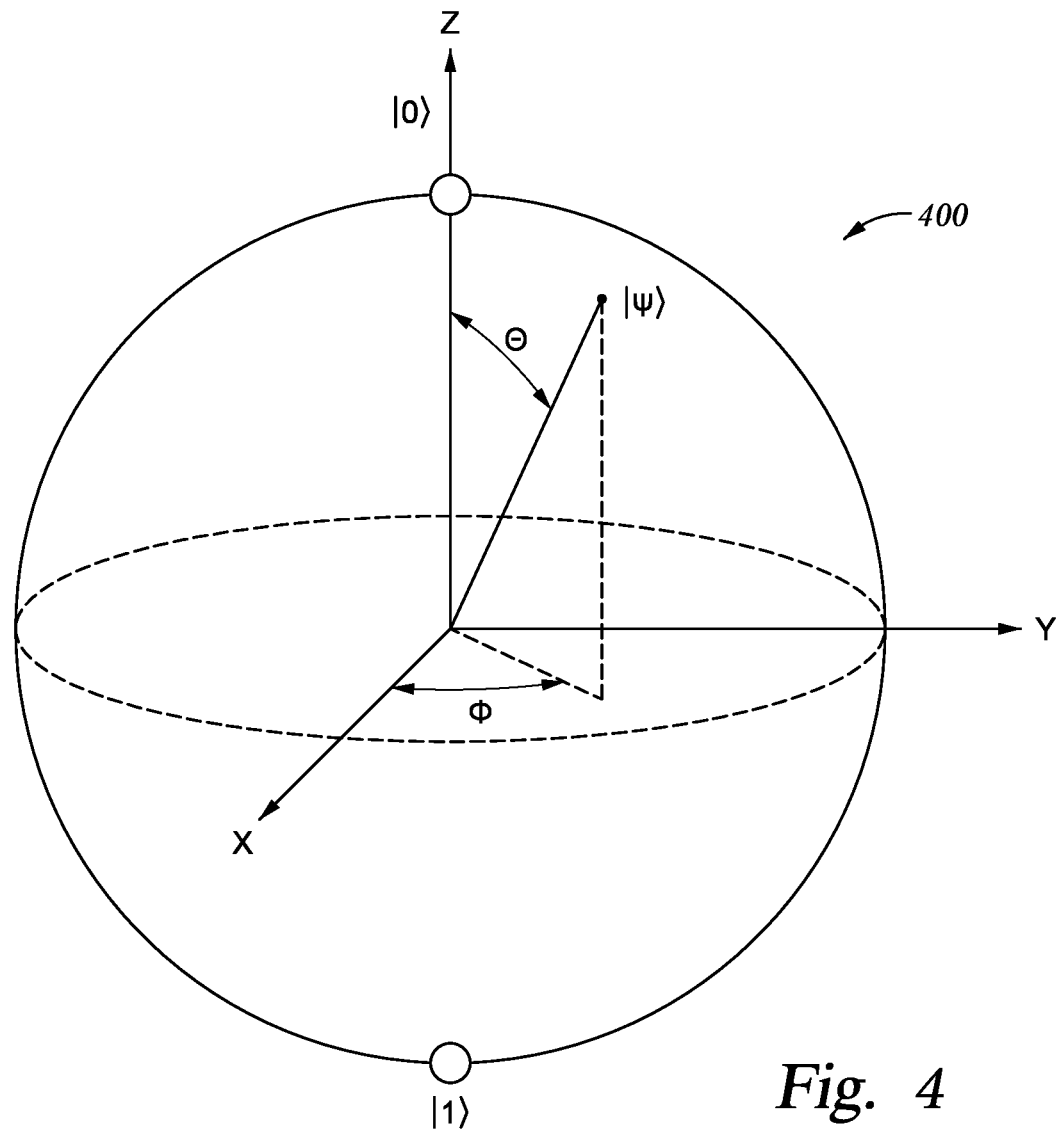
FIG. 4 depicts a qubit state of an ion represented as a point on a surface of the Bloch sphere.

FIG. 4 is provided to help visualize a qubit state of an ion is represented as a point on a surface of the Bloch sphere 400 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "$\pi$-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter for convenience) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "$\pi/2$-pulse". More generally, a superposition of the two qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and $\pi$, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

Entanglement Formation

Figure 5A:
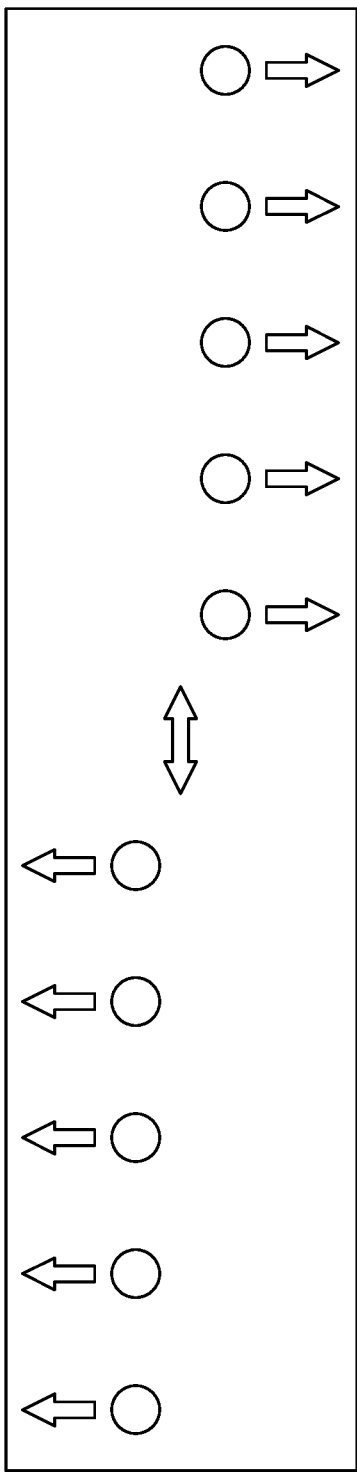
FIGS. 5A, 5B, and 5C depict a few schematic collective transverse motional mode structures of a group of five trapped ions.
Figure 5B:
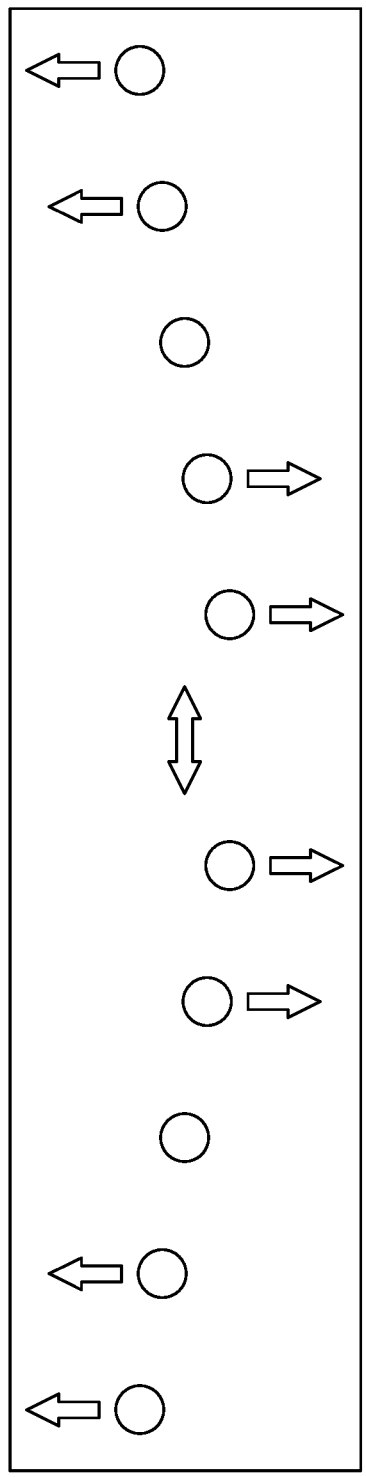
Figure 5C:
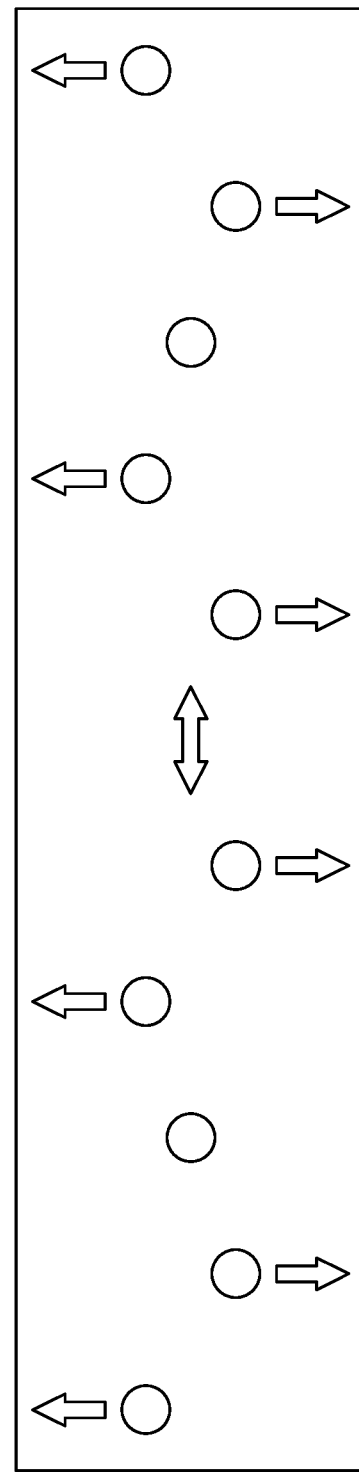

FIGS. 5A, 5B, and 5C depict a few schematic structures of collective transverse motional modes (also referred to simply as "motional mode structures") of a group 106 of five trapped ions, for example. Here, the confining potential due to a static voltage $V_S$ applied to the end-cap electrodes 210 and 212 is weaker compared to the confining potential in the radial direction. The collective motional modes of the group 106 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the m-th lowest energy is hereinafter referred to as $|n_{ph}\rangle_m$, where $n_{ph}$ denotes the number of motional quanta (in units of energy excitation, referred to as phonons) in the motional mode, and the number of motional modes M in a given transverse direction is equal to the number of trapped ions in the group 106. FIGS. 5A-5C schematically illustrates examples of different types of collective transverse motional modes that may be experienced by five trapped ions that are positioned in a group 106. FIG. 5A is a schematic view of a common motional mode $|n_{ph}\rangle_M$ having the highest energy, where M is the number of motional modes. In the common motional mode $|n\rangle_M$, all ions oscillate in phase in the transverse direction. FIG. 5B is a schematic view of a tilt motional mode $|n_{ph}\rangle_{M-1}$ which has the second highest energy. In the tilt motional mode, ions on opposite ends move out of phase in the transverse direction (i.e., in opposite directions). FIG. 5C is a schematic view of a higher-order motional mode $|n_{ph}\rangle_{M-3}$ which has a lower energy than that of the tilt motional mode $|n_{ph}\rangle_{M-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 6A:
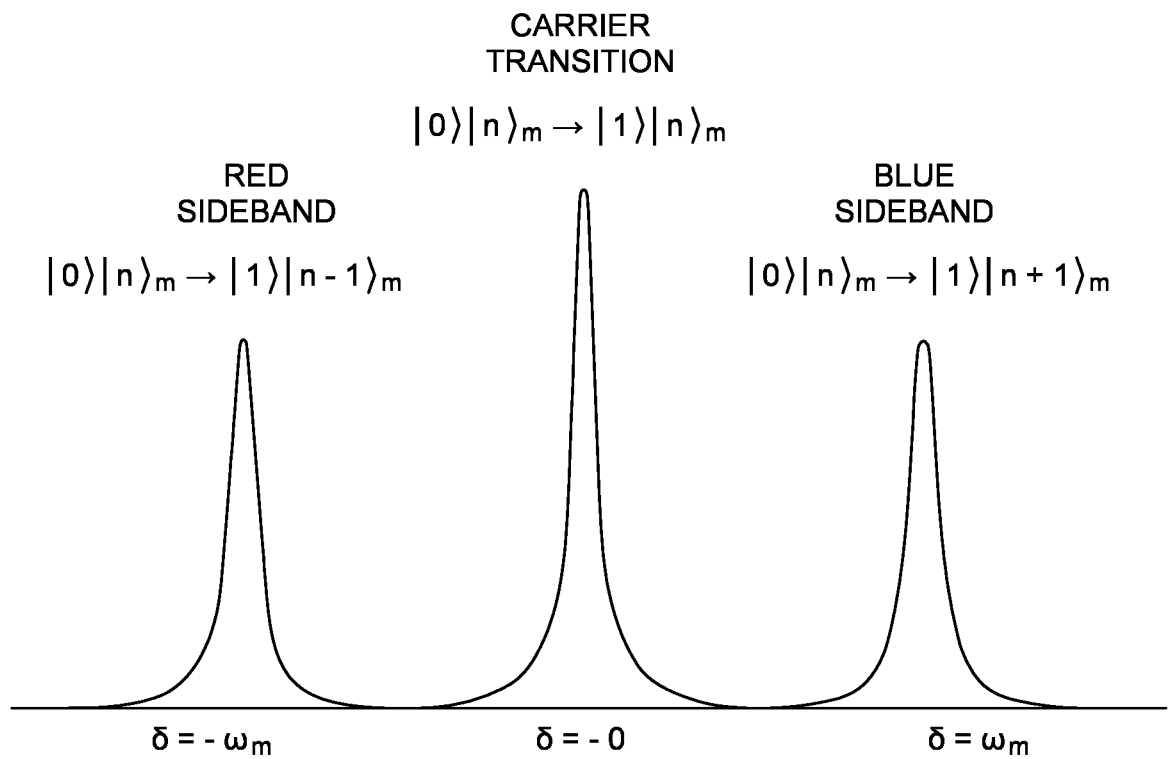
FIGS. 6A and 6B depict schematic views of motional sideband spectrum of each ion and a motional mode according to one embodiment.
Figure 6B:
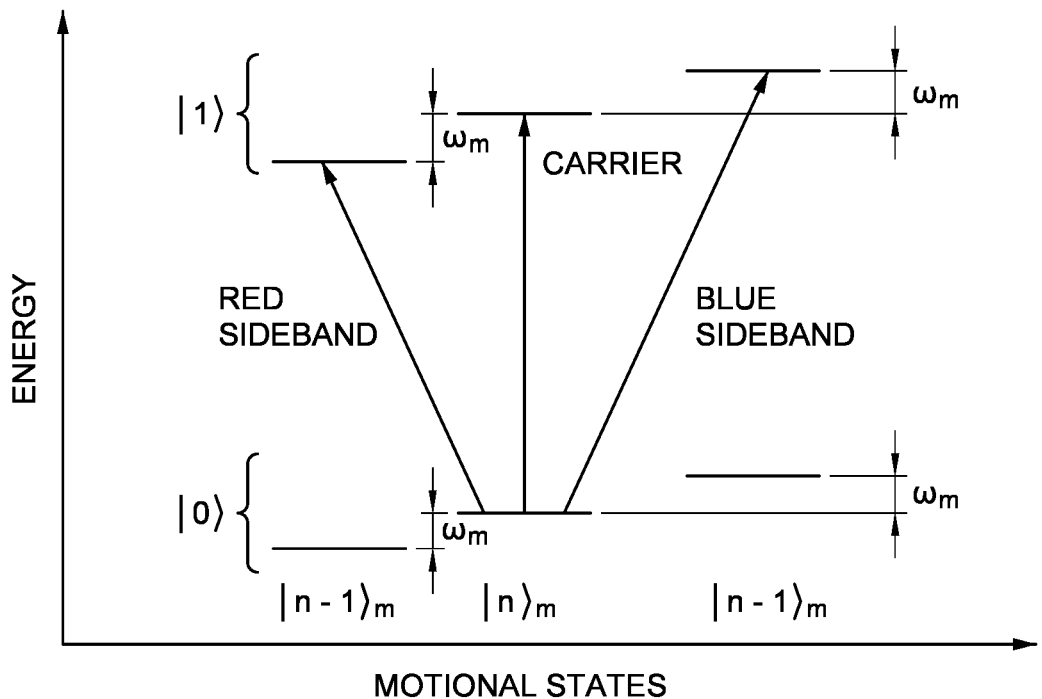

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the group 106 in a motional mode $|n_{ph}\rangle_M$ having frequency $\omega_m$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_m$ and $|1\rangle|n_{ph}+1\rangle_m$ occurs (i.e., a transition from the m-th motional mode with n-phonon excitations denoted by $|n_{ph}\rangle_m$ to the m-th motional mode with $(n_{ph}+1)$-phonon excitations denoted by $|n_{ph}+1\rangle_m$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_m$ of the motional mode $|n_{ph}\rangle_m$, $\delta=\omega_1-\omega_2-\omega_{01}=-\mu<0$, referred to as a red sideband), Rabi flopping between combined qubit-motional states $|0\rangle|n_{ph}\rangle_m$ and $|1\rangle|n_{ph}-1\rangle_m$ occurs (i.e., a transition from the motional mode $|n_{ph}\rangle_m$ to the motional mode $|n_{ph}-1\rangle_m$ with one less phonon excitations occurs when the qubit state $|0\rangle$ flips to $|1\rangle$). A $\pi/2$-pulse on the blue sideband applied to a qubit transforms the combined qubit-motional state $|0\rangle|n_{ph}\rangle_m$ into a superposition of $|0\rangle|n_{ph}\rangle_m$ and $|1\rangle|n_{ph}+1\rangle_m$. A $\pi/2$-pulse on the red sideband applied to a qubit transforms the combined qubit-motional $|0\rangle|n_{ph}\rangle_m$ into a superposition of $|0\rangle|n_{ph}\rangle_m$ and $|1\rangle|n_{ph}-1\rangle_m$. When the two-photon Rabi frequency $\Omega(t)$ is smaller as compared to the detuning frequency $\delta=\omega_1-\omega_2-\omega_{01}=\pm\mu$, the blue sideband transition or the red sideband transition may be selectively driven. Thus, a qubit can be entangled with a desired motional mode by applying the right type of pulse, such as a $\pi/2$-pulse, which can be subsequently entangled with another qubit, leading to an entanglement between the two qubits that is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and $|1\rangle_i|1\rangle_j$ as follows:

$|0\rangle_i|0\rangle_j \rightarrow |0\rangle_i|0\rangle_j - i|1\rangle_i|1\rangle_j$ $|0\rangle_i|1\rangle_j \rightarrow |0\rangle_i|1\rangle_j - i|1\rangle_i|0\rangle_j$ $|1\rangle_i|0\rangle_j \rightarrow -i|0\rangle_i|1\rangle_j + |1\rangle_i|0\rangle_j$ $|1\rangle_i|1\rangle_j \rightarrow |i|0\rangle_i|0\rangle_j + |1\rangle_i|1\rangle_j$.

For example, when the two qubits (i-th and j-th qubits) are both initially in the hyperfine ground state $|0\rangle$ (denoted as $|0\rangle_i|0\rangle_j$) and subsequently a $\pi/2$-pulse on the blue sideband is applied to the i-th qubit, the combined state of the i-th qubit and the motional mode $|0\rangle_i|n_{ph}\rangle_m$ is transformed into a superposition of $|0\rangle_i|n_{ph}\rangle_m$ and $|1\rangle_i|n_{ph}+1\rangle_m$, and thus the combined state of the two qubits and the motional mode is transformed into a superposition of $|0\rangle_i|0\rangle_j|n_{ph}\rangle_m$ and $|1\rangle_i|0\rangle_j|n_{ph}+1\rangle_m$. When a $\pi/2$-pulse on the red sideband is applied to the j-th qubit, the combined state of the j-th qubit and the motional mode $|0\rangle_j|n_{ph}\rangle_m$ is transformed to a superposition of $|0\rangle_j|n_{ph}\rangle_m$ and $|1\rangle_j|n_{ph}-1\rangle_m$ and the combined state $|0\rangle_j|n_{ph}+1\rangle_m$ is transformed into a superposition of $|0\rangle_j|n_{ph}+1\rangle_m$ and $|1\rangle_j|n_{ph}\rangle_m$.

Thus, applications of a $\pi/2$-pulse on the blue sideband on the i-th qubit and a $\pi/2$-pulse on the red sideband on the j-th qubit may transform the combined state of the two qubits and the motional mode $|0\rangle_i|0\rangle_j|n_{ph}\rangle_m$ into a superposition of $|0\rangle_i|0\rangle_j|n_{ph}\rangle_m$ and $|1\rangle_i|1\rangle_j|n_{ph}\rangle_m$, the two qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_m$ and $|0\rangle_i|1\rangle_j|n_{ph}-1\rangle_m$) can be removed by a sufficiently complex pulse sequence, and thus the combined state of the two qubits and the motional mode after the XX-gate operation may be considered disentangled as the initial number of phonon excitations $n_{ph}$ in the m-th motional mode stays unchanged at the end of the XX-gate operation. Thus, qubit states before and after the XX-gate operation will be described below generally without including the motional modes.

More generally, the combined state of i-th and j-th qubits transformed by the application of pulses on the sidebands for duration $\tau$ (referred to as a "gate duration"), having amplitudes $\Omega^{(i)}$ and $\Omega^{(j)}$ and detuning frequency $\mu$, can be described in terms of an entangling interaction $\chi^{(i,j)}(\tau)$ as follows:

$|0\rangle_i|0\rangle_j \rightarrow \cos(2\chi^{(i,j)}(\tau))|0\rangle_i|0\rangle_j - i\sin(2\chi^{(i,j)}(\tau))|1\rangle_i|1\rangle_j$ $|0\rangle_i|1\rangle_j \rightarrow \cos(2\chi^{(i,j)}(\tau))|0\rangle_i|1\rangle_j - i\sin(2\chi^{(i,j)}(\tau))|1\rangle_i|0\rangle_j$ $|1\rangle_i|0\rangle_j \rightarrow -i\sin(2\chi^{(i,j)}(\tau))|0\rangle_i|0\rangle_{nj} + \cos(2\chi^{(i,j)}(\tau))|1\rangle_i|1\rangle_j$ $|1\rangle_i|1\rangle_j \rightarrow -i\sin(2\chi^{(i,j)}(\tau))|0\rangle_i|0\rangle_j - \cos(2\chi^{(i,j)}(\tau))|1\rangle_i|1\rangle_j$ where, $\chi^{(i,j)}(\tau) = -4\sum_{m=1}^{M}\eta_m^{(i)}\eta_m^{(j)}\int_0^\tau dt_2 \int_0^{t_2} dt_1 \Omega^{(i)}(t_2)\Omega^{(j)}(t_1)\cos(\mu t_2)\cos(\mu t_1)\sin[\omega_m(t_2-t_1)]$ and $\eta_m^{(i)}$ is the Lamb-Dicke parameter that quantifies the coupling strength between the i-th ion and the m-th motional mode having the frequency $\omega_m$, and M is the number of the motional modes (equal to the number N of ions in the group 106).

The entanglement interaction between two qubits described above can be used to perform an XX-gate operation. The XX-gate operation (XX gate) along with single-qubit operations (R gates) forms a set of elementary logic operations {R, XX} that can be used to build a quantum computer that is configured to perform desired computational processes. Among several known sets of elementary logic operations by which any quantum algorithm can be decomposed, a set of elementary logic operations, commonly denoted as {R, XX}, is native to a quantum computing system of trapped ions described herein. Here, the R gate corresponds to manipulation of individual qubit states of trapped ions, and the XX gate (also referred to as an "entangling gate") corresponds to manipulation of the entanglement of two trapped ions.

To perform an XX-gate operation between i-th and j-th qubits, pulses that satisfy the condition $\chi^{(i,j)}(\tau)=\theta^{(i,j)}$ ($0<\theta^{(i,j)} \leq \pi/8$) (i.e., the entangling interaction $\chi^{(i,j)}(\tau)$ has a desired value $\theta^{(i,j)}$, referred to as condition for a non-zero entanglement interaction) are constructed and applied to the i-th and the j-th qubits. The transformations of the combined state of the i-th and the j-th qubits described above corresponds to the XX-gate operation with maximal entanglement when $\theta^{(i,j)}=\pi/8$. Amplitudes $\Omega^{(i)}(t)$ and $\Omega^{(j)}(t)$ of the pulses to be applied to the i-th and the j-th qubits are control parameters that can be adjusted to ensure a non-zero tunable entanglement of the i-th and the j-th qubits to perform a desired XX gate operation on i-th and j-th qubits.

Other two-qubit gate operations, such as a controlled-NOT (referred to as "CNOT") gate and a SWAP gate, may be used in the method of pattern matching described below and implemented by use of a combination of the XX gate operations and single-qubit gate operations.

In general, a CNOT gate operation conditioned on i-th qubit (control bit) and targeted on j-th qubit (target bit) inverts the j-th qubit (target bit) if the i-th qubit (control bit) in state $|1\rangle$, and leaves both the i-th and j-th qubits unchanged otherwise, thus transforming a two-qubit state $|x\rangle_i|y\rangle_j$ (x,y={0,1}) to a two-qubit state $|x\rangle_i|x\oplus y\rangle_j$:

$$|x\rangle_i|y\rangle_j \xrightarrow{\text{CNOT}} |x\rangle_i|x\oplus y\rangle_j.$$

The output of the j-th qubit (target bit) is the exclusive OR (XOR, denoted by "$\oplus$") of the i-th and j-th qubits. A SWAP gate operation between i-th and j-th qubits swaps the i-th and j-th qubits, thus transforming a two-qubit state $|x\rangle_i|y\rangle_j$ (x, y={0,1}) to a two-qubit state $|y\rangle_i|x\rangle_j$:

$$|x\rangle_i|y\rangle_j \xrightarrow{\text{SWAP}} |y\rangle_i|x\rangle_j.$$

Three-qubit gate operations, such as a controlled-controlled-NOT gate (also referred to as "Toffoli gate") and a controlled-SWAP gate (also referred to as "Fredkin gate"), may also be used in the method of pattern matching described below and implemented by use of a combination of the XX gate operations and single-qubit gate operations. A Toffoli gate operation applied to two control bits and one target bit inverts the target bit only if both of the control bits are in state $|1\rangle$, and leaves all three qubits unchanged otherwise, thus transforming a three-qubit state $|x\rangle|y\rangle|z\rangle$ (x, y, z={0,1}) to a three-qubit state $|x\rangle|y\rangle|(x\cdot y)\oplus z\rangle$:

$$|x\rangle|y\rangle|z\rangle \xrightarrow{\text{Toffoli}} |x\rangle|y\rangle|(x\cdot y)\oplus z\rangle.$$

The output of the target bit includes XOR($\oplus$) of the target bit and AND (denoted by "·") of the control qubits. A Fredkin gate operation applied to one control bit and two target bits swaps the target bits if the control bit is state $|1\rangle$, and laves all three qubits unchanged otherwise, thus transforming a three-qubit state $|x\rangle|y\rangle|z\rangle$ (x,y,z={0,1}) to a three-qubit state $|x\rangle|(x\cdot z)\oplus(\bar{x}\cdot y)\rangle|(x\cdot y)\oplus(\bar{x}\cdot z)\rangle$:

$$|x\rangle|y\rangle|z\rangle \xrightarrow{\text{Fredkin}} |x\rangle|(x\cdot z)\oplus(\bar{x}\cdot y)\rangle|(x\cdot y)\oplus(\bar{x}\cdot z)\rangle,$$

where the output of the target bits include NOT of the target bit (denoted by "¯").

Accelerated Pattern Matching Method on a Quantum Computing System

In a quantum computing system, a quantum computer is a domain-specific accelerator (also referred to as a "quantum processor" hereinafter) that is able to accelerate certain computational tasks beyond the reach of classical computers. Examples of such computational tasks include searching a given set of data that can be used for pattern matching. Pattern matching is used in a wide range of applications, such image processing, study of DNA sequences, and data compression and statistics. However, complexity of pattern matching increases drastically as a problem size (e.g., the lengths of a string and a pattern to be searched within the string) increases and may be unsolvable or be too complex to complete in a reasonable amount of time by a classical computer alone. Thus, methods for accelerated pattern matching on a quantum computing system are described herein.

It should be noted that the particular example embodiments described herein are just some possible examples of a quantum computing system according to the present disclosure and do not limit the possible configurations, specifications, or the like of quantum computer systems according to the present disclosure. For example, a quantum computing system according to the present disclosure can be applied to other types of computational task in which searching of data contributes to the computational complexity and can be accelerated by use of a quantum processor.

Figure 7:
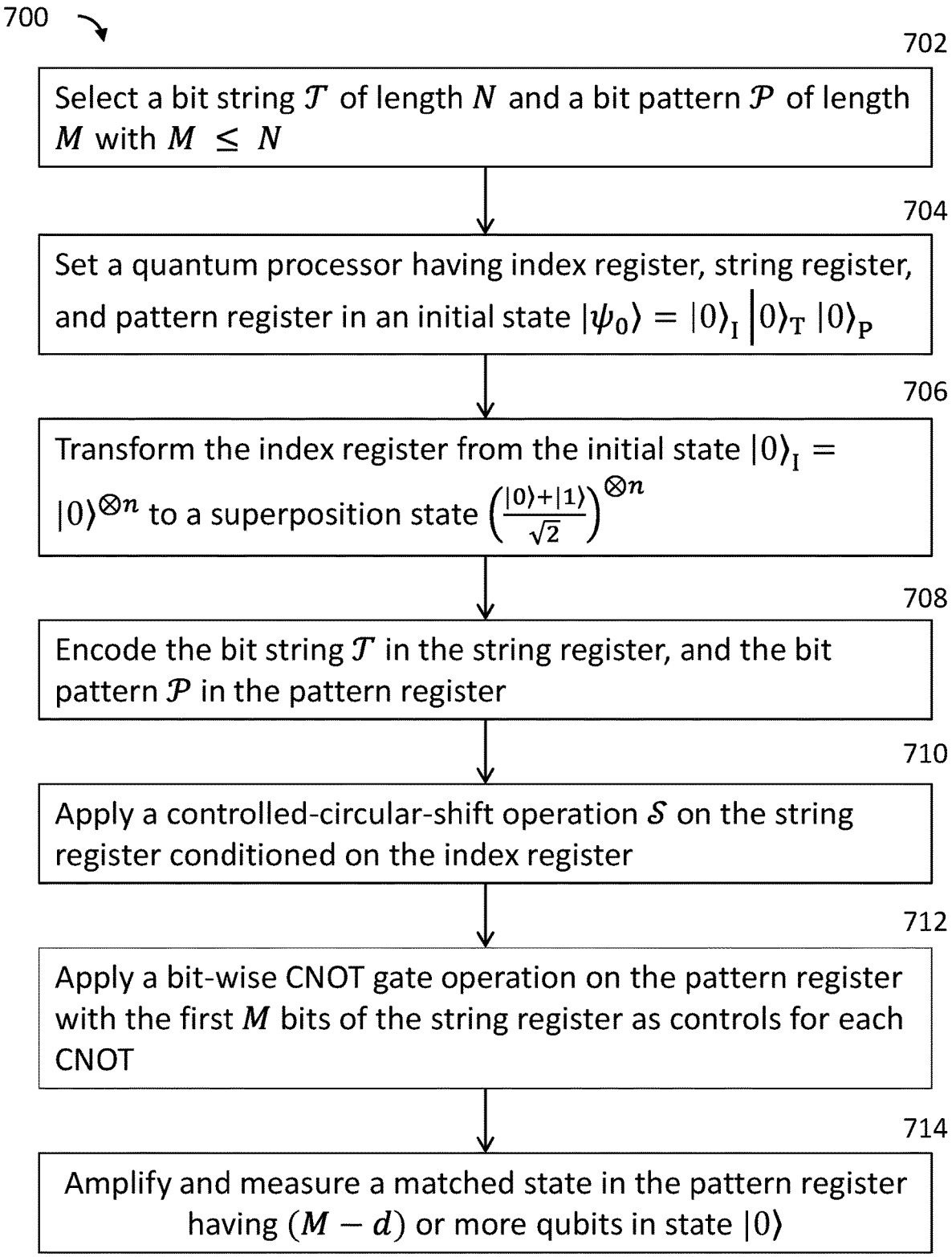
FIG. 7 depicts a flowchart illustrating a method of searching for a bit pattern within a bit string according to one embodiment.

FIG. 7 depicts a flowchart illustrating a method 700 of searching for a bit pattern within a bit string. A bit string and a bit pattern are sequences of bits, each of which has single binary value, either 0 or 1. In the example described herein, the quantum processor is the group 106 of trapped ions, in which the two hyperfine states of each of the trapped ions form a qubit that has binary qubit states $|0\rangle$ and $|1\rangle$.

In block 702, by the classical computer 102, a pattern matching problem is selected, for example, by use of a user interface of the classical computer 102, or retrieved from the memory of the classical computer 102. Specifically, a bit string $\mathcal{T}$ ($t_0 t_1 \ldots t_{N-1}$) of length N and a bit pattern $\mathcal{P}$ ($p_0 p_1 \ldots p_{M-1}$) of length M with M≤N are selected. The pattern matching problem is to search and locate the bit pattern $\mathcal{P}$ within the bit string $\mathcal{T}$. Pattern matching may be exact match (i.e., a M-bit long sequence contained in the bit string $\mathcal{T}$ exactly matches the bit pattern $\mathcal{P}$) or fuzzy match (i.e., (M–d) bits of a M-bit long sequence contained in the bit string $\mathcal{T}$ matches the bit pattern $\mathcal{P}$, where d is a predetermined number indicating fuzziness in the matching).

In block 704, by the system controller 104, the quantum processor 106 is set in an initial state $|\psi_0\rangle=|0\rangle_I|0\rangle_T|0\rangle_P$. The first register (denoted by the subscript "I" and referred to also as an "index register" hereinafter) is formed of n=$\log_2 N$ qubits $|k_0\rangle \ldots |k_{n-1}\rangle = \otimes_{i=0}^{n-1} |k_i\rangle$ to be used to encode a string index $$k\left(= 2^0 k_0 + 2^1 k_1 + \ldots + 2^{n-1} k_{n-1} = \sum_{j=0}^{n-1} 2^j k_j = 0, 1, \ldots, N-1\right).$$

In the initial state $|\psi_0\rangle = |0\rangle_I |0\rangle_T |0\rangle_P$, all qubits of the index register are prepared in state $|0\rangle$ (i.e., $|0\rangle_I = |0\rangle^{\otimes n}$), for example, the hyperfine ground state $|0\rangle$, by optical pumping in an exemplary quantum computer with trapped ions. The second register (denoted by the subscript "T" and referred to also as a "string register" hereinafter) is formed of N qubits to be used to encode the bit string $\mathcal{T}(t_0 t_1 \ldots t_{N-1})$. In the initial state $|\psi_0\rangle = |0\rangle_I |0\rangle_T |0\rangle_P$, all qubits of the string register are prepared in state $|0\rangle$ (i.e., $|0\rangle_T = |0\rangle^{\otimes N}$). The third register (denoted by the subscript "P" and referred to as a "pattern register" hereinafter) is formed of M qubits to be used to encode the bit pattern $\mathcal{P}$. In the initial state $|\psi_0\rangle = |0\rangle_I |0\rangle_T |0\rangle_P$, all qubits of the pattern register are prepared in state $|0\rangle$ (i.e., $|0\rangle_P = |0\rangle^{\otimes M}$).

In block 706, by the system controller 104, each qubit of the index register is transformed from state $|0\rangle$ to a linear superposition state of $|0\rangle$ and $|1\rangle$, $(|0\rangle + |1\rangle)/\sqrt{2}$, thus transforming the index register from the initial state $|0\rangle_I = |0\rangle^{\otimes n}$ to a superposition state $$\left(\frac{|0\rangle + |1\rangle}{\sqrt{2}}\right)^{\otimes n} = \otimes_{j=0}^{n-1}\left(\sum_{k_j=\{0,1\}} \frac{|k_j\rangle}{\sqrt{2}}\right)$$

in the quantum processor 106. The index register is now in a superposition of $2^n (=N)$ states ($|0\rangle|0\rangle \ldots |0\rangle, |0\rangle|0\rangle \ldots |1\rangle, \ldots, |1\rangle|1\rangle \ldots |1\rangle$) each associated with a string index $k(=0, 1, \ldots N-1)$ (thus, referred to as string index states), and may be denoted as $$\frac{1}{\sqrt{N}} \sum_{k=0}^{N-1} |k\rangle_I,$$

where $|k\rangle_I$ is a state formed of n $(=\log_2 N)$ qubits defined as $|k\rangle_I = |k_0\rangle |k_1\rangle \ldots |k_{n-1}\rangle$ $\left(k = \sum_{j=0}^{n-1} 2^j k_j = 0, 1, \ldots, N-1\right).$ By this transformation, the quantum processor 106 is transformed from the initial state $|\psi_0\rangle = |0\rangle_I |0\rangle_T |0\rangle_P$ to an initial superposition state $$|\psi_S\rangle = \frac{1}{\sqrt{N}} \sum_{k=0}^{N-1} |k\rangle_I |0\rangle_T |0\rangle_P$$

(i.e., a superposition of combined states of the index register, the string register, and the pattern register). This transformation may be implemented by application of a proper combination of single-qubit operations to the n=($\log_2 N$) qubits of the index register in the initial state $|\psi_0\rangle = |0\rangle_I |0\rangle_T |0\rangle_P$ in a single time step in units of elementary logic operations.

In block 708, by the system controller 104, the bit string $\mathcal{T}(t_0 t_1 \ldots t_{N-1})$ is encoded in the string register, and the bit pattern $\mathcal{P}(p_0 p_1 \ldots p_{M-1})$ is encoded in the pattern register in the quantum processor 106. Specifically, the i-th bit information $t_i$ (i=0, 1, . . . N−1) of the bit string $\mathcal{T}(t_0 t_1 \ldots t_{N-1})$ is encoded in the i-th qubit of the string register as $|\mathcal{T}\rangle_T = |t_0\rangle |t_1\rangle \ldots |t_{N-1}\rangle = \otimes_{i=0}^{N-1} |t_i\rangle$ (i=0, 1, . . . N−1) (referred to as a string encoded state). That is, the string register is transformed form the initial state of the string register $|0\rangle_T$ to the string encoded state $|\mathcal{T}\rangle_T$. Similarly, the i-th bit information $p_i$ (i=0, 1, . . . M−1) of the bit pattern $\mathcal{P}(p_0 p_1 \ldots p_M)$ is encoded in the i-th qubit of the pattern register as $|\mathcal{P}\rangle_P = |p_0\rangle |p_1\rangle \ldots |p_{M-1}\rangle = \otimes_{i=0}^{M-1} |p_i\rangle$ (0, 1, . . . M−1) (referred to as a pattern encoded state). That is, the pattern register is transformed from the initial state of the pattern register $|0\rangle_P$ to the pattern encoded state $|\mathcal{P}\rangle_P$. These operations may be implemented by application of a proper combination of single-qubit operations to the N qubits of the string register in the initial state $|0\rangle_T$ and to the M qubits of the pattern register in the initial state $|0\rangle_P$ in a single time step in units of elementary logic operations.

In block 710, by the system controller 104, a controlled-circular-shift operation S is applied on the string register in the string encoded state $|\mathcal{T}\rangle_T = \otimes_{i=0}^{N-1} |t_i\rangle$ conditioned on the index register in the initial superposition state $$\frac{1}{\sqrt{N}} \sum_{k=0}^{N-1} |k\rangle_I$$

in the quantum processor 106. That is, all qubits of the string register are circularly shifted (e.g., left-circularly shifted) by k bit positions in a combined state having the index register in state $|k\rangle_I$ (referred to as an operation $\mathcal{S}_k$):

$\mathcal{S}_{|k\rangle_I} \otimes_{i=0}^{N-1} |t_i\rangle = |k\rangle_I \otimes_{i=0}^{N-1} \mathcal{S}_k |t_i\rangle = |k\rangle_I$
$\otimes_{i=0}^{N-1} |t_{i+k \bmod N}\rangle.$ Thus, the operation $\mathcal{S}_k$ transforms the string register in the state having the index register in $|k\rangle_I$ from the string encoded state $|\mathcal{T}\rangle_T = \otimes_{i=0}^{N-1} |t_i\rangle$ to a circularly shifted state $|\mathcal{T}\rangle_T^{(k)} = \otimes_{i=0}^{N-1} |t_{i+k \bmod N}\rangle$.

The controlled-circular-shift operation $\mathcal{S}_k$ conditioned on the n-qubit long index register $|k\rangle_I$ may be implemented as a series of bit-wise circular shift operation $\mathcal{S}_{2^j}^{(k_j)}$ conditioned on the j-th qubit $|k_j\rangle$ of the index register that left-circularly shifts all qubits of the string register by $2^j$ bit positions:

$$|k\rangle_I \otimes_{i=0}^{N-1} \mathcal{S}_k |t_i\rangle = \left(\otimes_{j=0}^{n-1} |k_j\rangle\right) \otimes_{i=0}^{N-1} \left(\prod_{j=0}^{n-1} \mathcal{S}_{2^j}^{(k_j)}\right) |t_i\rangle.$$

The bit-wise controlled-circular-shift operator $\mathcal{S}_{2^j}^{(k_j)}$ may be implemented as a combination of controlled-SWAP operations targeted on the string register (each of which interchanges a pair among the N qubits of the string register) conditioned on the j-th qubit $|k_j\rangle$ of the index register. Among the required controlled-SWAP operations, N/2 controlled-SWAP operations to circularly shift N/2 qubits among the total N qubits by $2^j$ bit positions may be applied in a single time step in units of elementary logic operations as described in detail below. In a subsequent time step, N/4 controlled-SWAP operations are applied to circularly shift a half of the N/2 remaining qubits by $2^j$ bit positions. At each subsequent time step, the number of qubits that need to be swapped decreased by half. Therefore, the bit-wise controlled-circular-shift operator $S_{2^j}^{(k_j)}$ targeted on N qubits may be implemented in $\mathcal{O}(\log(N))$ time steps in units of elementary logic operations using parallel controlled-SWAP operations.

To implement, in one time step in units of elementary logic operations, at most N/2 controlled-SWAP operations controlled by the same control qubit, N/2 ancillary qubits, each initialized to state $|0\rangle$, may be used. Using a fan-out CNOT operation on the ancillary qubits with the control qubit, the control qubit state may be copied into the ancillary qubits. With the N/2 available copies of the control qubit state, each controlled-SWAP operations may then be implemented in parallel since each one of at most N/2 controlled-SWAP operations may use each one of the available control state copies encoded in the ancillary qubits. Once all of controlled-SWAP operations in a given bit-wise controlled-circular-shift operator $S_{2^j}^{(k_j)}$ are implemented, the ancillary qubits may be restored to state $|0\rangle$ by subsequently applying another fan-out CNOT operation as described above. The fan-out operation may be implemented in $\mathcal{O}(\log(N))$ time steps in units of elementary logic operations.

The CNOT gate operations and the controlled-SWAP operations used to perform the controlled-circular-shift operation S may be each implemented by application of a proper combination of single-qubit operations and two-qubit gate operations to the $n=(\log_2 N)$ qubits of the index register in the initial superposition state $$\frac{1}{\sqrt{N}} \sum_{k=0}^{N-1} |k\rangle_I,$$

the N qubits of the string register in the string encoded state $|\mathcal{T}\rangle_T = \otimes_{i=0}^{N-1} |t_i\rangle$, and N/2 ancillary qubits, each initialized to state $|0\rangle$.

In block 712, by the system controller 104, a bit-wise CNOT gate operation is applied on the pattern register in the pattern encoded state $|\mathcal{P}\rangle_P = \otimes_{i=0}^{M-1}|p_i\rangle$ conditioned on the first M bits of the string register in the string encoded state $|\mathcal{T}\rangle_T^{(k)} = \otimes_{i+k}^{N-1}|t_{i+k \mod N}\rangle$. That is, the bit-wise CNOT gate operation brings the pattern register from the pattern encoded state $|\mathcal{P}\rangle_P = \otimes_{i=0}^{N-1}|p_i\rangle$ to a string-pattern matching evaluation state $(\otimes_{i=0}^{M-1}|p_i \oplus t_{i+k \mod N}\rangle)$. After this transformation, if the first M bits of the string register in the circularly shifted state $|\mathcal{T}\rangle_T^{(k)} = \otimes_{i=0}^{M-1}|t_{i+k \mod N}\rangle$ exactly match all qubits of the pattern register in the pattern encoded state $|\mathcal{P}\rangle_P = \otimes_{i=0}^{M-1}|p_i\rangle$ (i.e., exact matching), all qubits $|p_i \oplus t_{i+k \mod N}\rangle$ of the pattern register in the string-pattern matching evaluation state $(\otimes_{i=0}^{M-1}|p_i \oplus t_{i+k \mod N}\rangle)$ are in state $|0\rangle$. If the first M qubits except for d qubits of the string register in the circularly shifted state $|\mathcal{T}\rangle_T^{(k)} = \otimes_{i=0}^{N-1}|t_{i+k \mod N}\rangle$ match the qubits of the pattern register in the pattern encoded state $|\mathcal{P}\rangle_P = \otimes_{i=0}^{M-1}|p_i\rangle$ (i.e., fuzzy matching), (M−d) qubits $|p_i \oplus t_{i+k \mod N}\rangle$ of the pattern register in the string-pattern matching evaluation state $(\otimes_{i=0}^{M-1}|p_i \oplus t_{i+k \mod N}\rangle)$ are in state $|0\rangle$ and d bits are in state $|1\rangle$.

The bit-wise CNOT gate operations can be implemented by the application of a combination of single-qubit gate operations and two-qubit gate operations by the system controller 104 in a single time step in units of elementary logic operations.

In block 714, by the system controller 104, the string-pattern matching evaluation state $(\otimes_{i=0}^{M-1}|p_i \oplus t_{i+k \mod N}\rangle)$ having (M−d) or more qubits in state $|0\rangle$ (referred to as a matched state) is amplified and measured. The exact matching corresponds to d=0. The fuzzy matching corresponds to d≥0. The string index k specifies the location of the matched string. The amplification of the matched state may be performed by applying an oracle operation $U_w$ on the pattern register, which reverses a phase of the matched state:

$$\otimes_{i=0}^{M-1}|x_i\rangle \xrightarrow{U_w} \begin{cases} (-1)\otimes_{i=0}^{M-1}|x_i\rangle & \text{if } \sum_{i=0}^{M-1} x_i \leq d \\ (+1)\otimes_{i=0}^{M-1}|x_i\rangle & \text{if } \sum_{i=0}^{M-1} x_i \geq d \end{cases}.$$

Oracle operations, such as the oracle operation $U_w$ described herein, may be implemented in $\mathcal{O}(\log(M))$ time steps in units of elementary logic operations using $\mathcal{O}(M)$ ancillary qubits in a quantum processor that has a long-range interactions, such as the exemplary quantum computer with trapped ions and needs to be repeated $\mathcal{O}(\sqrt{N})$ times for successful amplification. Once an amplitude of the index register (in the superposition of string index states) is measured, the matched state in which the string-pattern matching evaluation state $(\otimes_{i=0}^{M-1}|p_i \oplus t_{i+k \mod N}\rangle)$ having (M−d) or more qubits in state $|0\rangle$ has the largest amplitude. The string index k associated with the measured matched state corresponds to the location of the pattern $\mathcal{P}$ within the bit string $\mathcal{T}$. Subsequently, the classical computer 102 generally outputs the measured result including whether or not the bit string $\mathcal{T}$ contains the bit pattern $\mathcal{P}$ and if it does, the location of the pattern $\mathcal{P}$ within the bit string $\mathcal{T}$.

In the embodiments described herein, the methods for a more efficient and accelerated pattern matching process is provided. The amount of time resources required to run a matching process for searching a bit pattern $\mathcal{P}$ of length M within a bit string $\mathcal{T}$ of length N by the method described herein scales as $\mathcal{O}(\sqrt{N}(\log(N)^2 + \log(M)))$ time steps in units of elementary logic operations. As described above, transformation of the index register to the superposition state in block 706 and encoding of the bit string $\mathcal{T}$ and the pattern $\mathcal{P}$ in block 708 may be each implemented in a single time step in units of elementary logic operations. In block 710, each bit-wise controlled-circular-shift operator $S_{2^j}^{(k_j)}$ may be implemented in $\mathcal{O}(\log(N))$ time steps in units of elementary logic operations, and thus the total controlled-circular-shift operation $S$ (that is $n=(\log_2 N)$ of the bit-wise controlled-circular shift operations) may be implemented in $\mathcal{O}(\log(N)^2)$ time steps in units of elementary logic operations. The application of bit-wise CNOT gate operation in block 712 may be implemented in a single time step in units of elementary logic operations. The evaluation of matching of the bit string $\mathcal{T}$ and the pattern $\mathcal{P}$ using the oracle operation $U_w$ in block 708 may be implemented in $\mathcal{O}(\log(M))$ time steps in units of elementary logic operations. For amplitude amplification, this process is effectively repeated $\mathcal{O}(\sqrt{N})$ times. Thus, in total, the pattern matching by the method described herein may be performed in $\mathcal{O}(\sqrt{N}(\log(N)^2 + \log(M)))$ time steps in units of elementary logic operations.

The amount of memory resources required to run a matching process for searching a bit pattern $\mathcal{P}$ of length M within a bit string $\mathcal{T}$ of length N by the method described herein scales as $\mathcal{O}(N+M)$ qubits. As described above, the amount of memory resources includes N to encode the bit string $\mathcal{T}(t_0 t_1 \ldots t_{N-1})$ of length N, M to encode the bit pattern $\mathcal{P}(p_0 p_1 \ldots p_{M-1})$ of length M, $n = \log_2 N$ to encode the string index, N/2 of ancillary qubits to implement parallel controlled-SWAP operations, and $\mathcal{O}(M)$ of ancillary qubits to implement the oracle operation $U_w$. Thus, the method requires $\mathcal{O}(N+M)$ qubits in total. Therefore, the method described herein provides improvement in the amount of time required to run a matching process by use of a quantum processor over a purely classical computational method, by allowing simultaneous search of a bit pattern in multiple locations in a bit string due to the use of the multiple states created by a quantum superposition.

While the foregoing is directed to specific embodiments, other and further embodiments may be devised without departing from the basic scope thereof, and the scope thereof is determined by the claims that follow.

The invention claimed is:

1. A method of determining a pattern in a sequence of bits using a quantum computing system comprising a classical computer and a quantum processor, the method comprising:
setting a first register of the quantum processor in a superposition of a plurality of string index states, each of which is associated with a string index, wherein the quantum processor comprises a plurality of qubits;
encoding a bit string in a second register of the quantum processor;
encoding a bit pattern in a third register of the quantum processor;
circularly shifting qubits of the second register conditioned on the first register in each string index state in the superposition of the plurality of string index states;
amplifying an amplitude of a state combined with the first register in a string index state of the plurality of string index states in which the circularly shifted qubits of the second register matches qubits of the third register;
measuring an amplitude of the first register and determining the string index state of the plurality of string index states associated with the amplified state; and
outputting, by use of the classical computer, the string index associated with the first register in the measured state.

2. The method according to claim 1, further comprising:
selecting, by use of the classical computer, the bit string and the bit pattern to be searched within the bit string, each bit of the bit string having a string index.

3. The method according to claim 1, wherein each qubit of the plurality of qubits comprises a trapped ion having two frequency-separated states.

4. The method according to claim 3, further comprising:
preparing the quantum processor in an initial state by setting, by a system controller, each trapped ion in the quantum processor in the lower energy state of the two frequency-separated states.

5. The method according to claim 4, wherein setting the first register of the quantum processor in the superposition of the plurality of string index states comprises transferring, by the system controller, each trapped ion in the first register in a superposition of the two frequency-separated states.

6. The method according to claim 4, wherein encoding the bit string in the second register of the quantum processor comprises applying, by the system controller, a combination of single-qubit gate operations to the second register of the quantum processor.

7. The method according to claim 4, wherein encoding the bit pattern in the third register of the quantum processor comprises applying, by the system controller, a combination of single-qubit gate operations to the third register of the quantum processor.

8. The method according to claim 4, wherein circularly shifting qubits of the second register conditioned on the first register comprises applying, by the system controller, a combination of single-qubit gate operations and two-qubit gate operations to the first and second registers of the quantum processor.

9. The method according to claim 8, wherein the two-qubit gate operations comprise controlled-SWAP operations applied to the second register conditioned on the first register.

10. The method according to claim 8, wherein the two-qubit gate operations comprise controlled-SWAP operations applied to the second register conditioned on a plurality of ancillary qubits in which the first register is copied by fan-out CNOT operations applied on the plurality of ancillary qubits conditioned on the first register.

11. The method according to claim 4, wherein amplifying the state combined with the first register in the string index state of the plurality of string index states in which the circularly shifted qubits of the second register matches qubits of the third register comprises applying, by the system controller, a combination of single-qubit gate operations and two-qubit gate operations to the second and third registers of the quantum processor.

12. A quantum computing system, comprising:
a quantum processor comprising a group of trapped ions, each of the trapped ions having two frequency-separated states;
one or more lasers configured to emit a laser beam, which is provided to trapped ions in the quantum processor;
a classical computer configured to:
select a bit string and a bit pattern to be searched within the bit string, each bit of the bit string having a string index; and
a system controller configured to:
set a first register of the quantum processor in a superposition of a plurality of string index states, each of which is associated with a string index, wherein the quantum processor comprises a plurality of qubits;
encode the bit string in a second register of the quantum processor;
encode the bit pattern in a third register of the quantum processor;
circularly shift qubits of the second register conditioned on the first register in each string index state in the superposition of the plurality of string index states;
amplify an amplitude of a state combined with the first register in a string index state of the plurality of string index states in which the circularly shifted qubits of the second register matches qubits of the third register; and
measure an amplitude of the first register and determining the string index state of the plurality of string index states associated with the amplified state,
wherein the classical computer is further configured to:
output the string index associated with the first register in the measured state.

13. The quantum computing system according to claim 12, wherein the system controller is further configured to:
prepare the quantum processor in an initial state by setting each trapped ion in the quantum processor in the lower energy state of the two frequency-separated states.

14. The quantum computing system according to claim 12, wherein setting the first register of the quantum processor in the superposition of the plurality of string index states comprises transferring each trapped ion in the first register in a superposition of the two frequency-separated states.

15. The quantum computing system according to claim 12, wherein encoding the bit string in the second register of the quantum processor comprises applying a combination of single-qubit gate operations to the second register of the quantum processor.

16. The quantum computing system according to claim 12, wherein encoding the bit pattern in the third register of the quantum processor comprises applying a combination of single-qubit gate operations to the third register of the quantum processor.

17. The quantum computing system according to claim 12, wherein circularly shifting qubits of the second register conditioned on the first register comprises applying, by the system controller, a combination of single-qubit gate operations and two-qubit gate operations to the first and second registers of the quantum processor.

18. The quantum computing system according to claim 17, wherein the two-qubit gate operations comprise controlled-SWAP operations applied to the second register conditioned on the first register.

19. The quantum computing system according to claim 17, wherein the two-qubit gate operations comprise controlled-SWAP operations applied to the second register conditioned on a plurality of ancillary qubits in which the first register is copied by fan-out CNOT operations applied on the plurality of ancillary qubits conditioned on the first register.

20. The quantum computing system according to claim 12, wherein amplifying the state combined with the first register in the string index state of the plurality of string index states in which the circularly shifted qubits of the second register matches qubits of the third register comprises applying, by the system controller, a combination of single-qubit gate operations and two-qubit gate operations to the second and third registers of the quantum processor.

* * * * *